United States Patent
Kazama et al.

(10) Patent No.: US 11,187,712 B2
(45) Date of Patent: Nov. 30, 2021

(54) AUTOMATED ANALYZER AND AUTOMATED ANALYSIS METHOD

(71) Applicant: Hitachi High-Technologies Corporation, Tokyo (JP)

(72) Inventors: Yuto Kazama, Tokyo (JP); Masahiko Iijima, Tokyo (JP); Chie Yabutani, Tokyo (JP); Kenji Kogure, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 4 days.

(21) Appl. No.: 16/646,386

(22) PCT Filed: Sep. 6, 2018

(86) PCT No.: PCT/JP2018/032999
§ 371 (c)(1),
(2) Date: Mar. 11, 2020

(87) PCT Pub. No.: WO2019/130668
PCT Pub. Date: Jul. 4, 2019

(65) Prior Publication Data
US 2020/0271677 A1 Aug. 27, 2020

(30) Foreign Application Priority Data
Dec. 26, 2017 (JP) .............................. JP2017-249513

(51) Int. Cl.
*G01N 35/02* (2006.01)
*G01N 35/00* (2006.01)
(Continued)

(52) U.S. Cl.
CPC .......... *G01N 35/02* (2013.01); *G01N 21/274* (2013.01); *G01N 21/47* (2013.01);
(Continued)

(58) Field of Classification Search
None
See application file for complete search history.

(56) References Cited

U.S. PATENT DOCUMENTS 3,963,909 A * 6/1976 Atwood ............... G01N 21/272
700/266
5,100,622 A * 3/1992 Mimura ........... G01N 35/00594
356/73
(Continued)

FOREIGN PATENT DOCUMENTS

JP 63-12964 A 1/1988
JP 8-262031 A 10/1996
(Continued)

OTHER PUBLICATIONS

International Search Report (PCT/ISA/210) issued in PCT Application No. PCT/JP2018/032999 dated Nov. 20, 2018 with English translation (four (4) pages).
(Continued)

*Primary Examiner* — Neil N Turk
(74) *Attorney, Agent, or Firm* — Crowell & Moring LLP

(57) ABSTRACT

The present invention makes it possible for an automated analyzer including two or more types of photometers to obtain suitable output of the measurement results of the plurality of photometers and suitable data alarm output even if there is an abnormality, or the like, at the time of measurement. This automated analyzer includes, for example, two types of photometers having different quantitative ranges and an analysis control unit for controlling analysis that includes measurement of a given sample using the two types of photometers. If two types of data alarms corresponding to abnormalities, or the like, during measurement have been added to the two types of measurement results from the two types of photometers, the analysis control unit selects measurement result and data alarm
(Continued)

output corresponding to the combination of the two types of data alarms and outputs the same to a user as analysis results.

12 Claims, 17 Drawing Sheets

(51) Int. Cl.
- *G01N 21/27* (2006.01)
- *G01N 21/47* (2006.01)
- *G01N 35/10* (2006.01)
- *G01N 27/416* (2006.01)
- *G01N 27/417* (2006.01)

(52) U.S. Cl.
CPC ..... *G01N 35/1002* (2013.01); *G01N 27/4163* (2013.01); *G01N 27/4175* (2013.01); *Y10T 436/115831* (2015.01); *Y10T 436/12* (2015.01)

(56) References Cited

U.S. PATENT DOCUMENTS

| | | | |
|---|---|---|---|
| 5,730,939 A | 3/1998 | Kurumada et al. | |
| 6,409,968 B1* | 6/2002 | Takahashi | G01N 21/253 422/552 |
| 8,990,894 B2* | 3/2015 | Miller | G09B 19/24 726/3 |
| 11,073,525 B2 | 7/2021 | Kaneko et al. | |
| 2007/0072299 A1* | 3/2007 | Orihashi | G01N 35/00 436/43 |
| 2011/0169836 A1 | 7/2011 | Orihashi et al. | |
| 2012/0237400 A1* | 9/2012 | Ikeda | G01N 35/00712 422/82.02 |
| 2012/0282155 A1 | 11/2012 | Kuwano et al. | |
| 2013/0317773 A1* | 11/2013 | Oda | G01N 35/00603 702/104 |
| 2014/0288854 A1* | 9/2014 | Satomura | G01N 35/00732 702/31 |
| 2015/0160251 A1 | 6/2015 | Yokokawa et al. | |
| 2015/0377771 A1 | 12/2015 | Orihashi et al. | |

FOREIGN PATENT DOCUMENTS

| | | |
|---|---|---|
| JP | 2000-221198 A | 8/2000 |
| JP | 2012-233807 A | 11/2012 |
| JP | 2014-6160 A | 1/2014 |
| JP | 2015-21952 A | 2/2015 |
| WO | WO 2010/027037 A1 | 3/2010 |
| WO | WO 2017/145601 A1 | 8/2017 |

OTHER PUBLICATIONS

Japanese-language Written Opinion (PCT/ISA/237) issued in PCT Application No. PCT/JP2018/032999 dated Nov. 20, 2018 (four (4) pages).

English translation of document C2 (Japanese-language Written Opinion (PCT/ISA/237) previously filed on Mar. 11, 2020) issued in PCT Application No. PCT/JP2018/032999 dated Nov. 20, 2018 (five (5) pages).

Extended European Search Report issued in European Application No. 18893760.1 dated Aug. 30, 2021 (10 pages).

* cited by examiner

[FIG. 1]
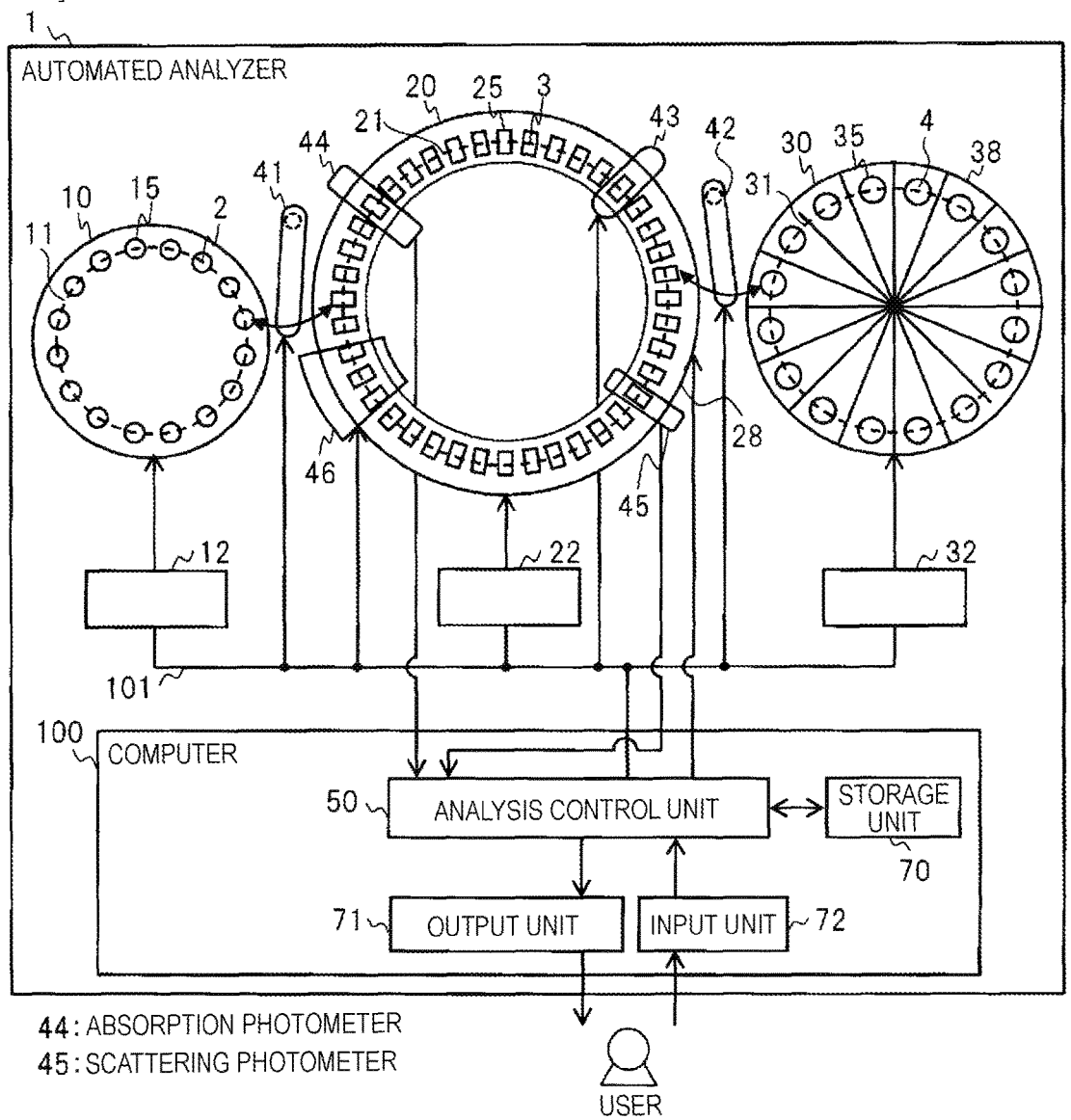
44: ABSORPTION PHOTOMETER
45: SCATTERING PHOTOMETER

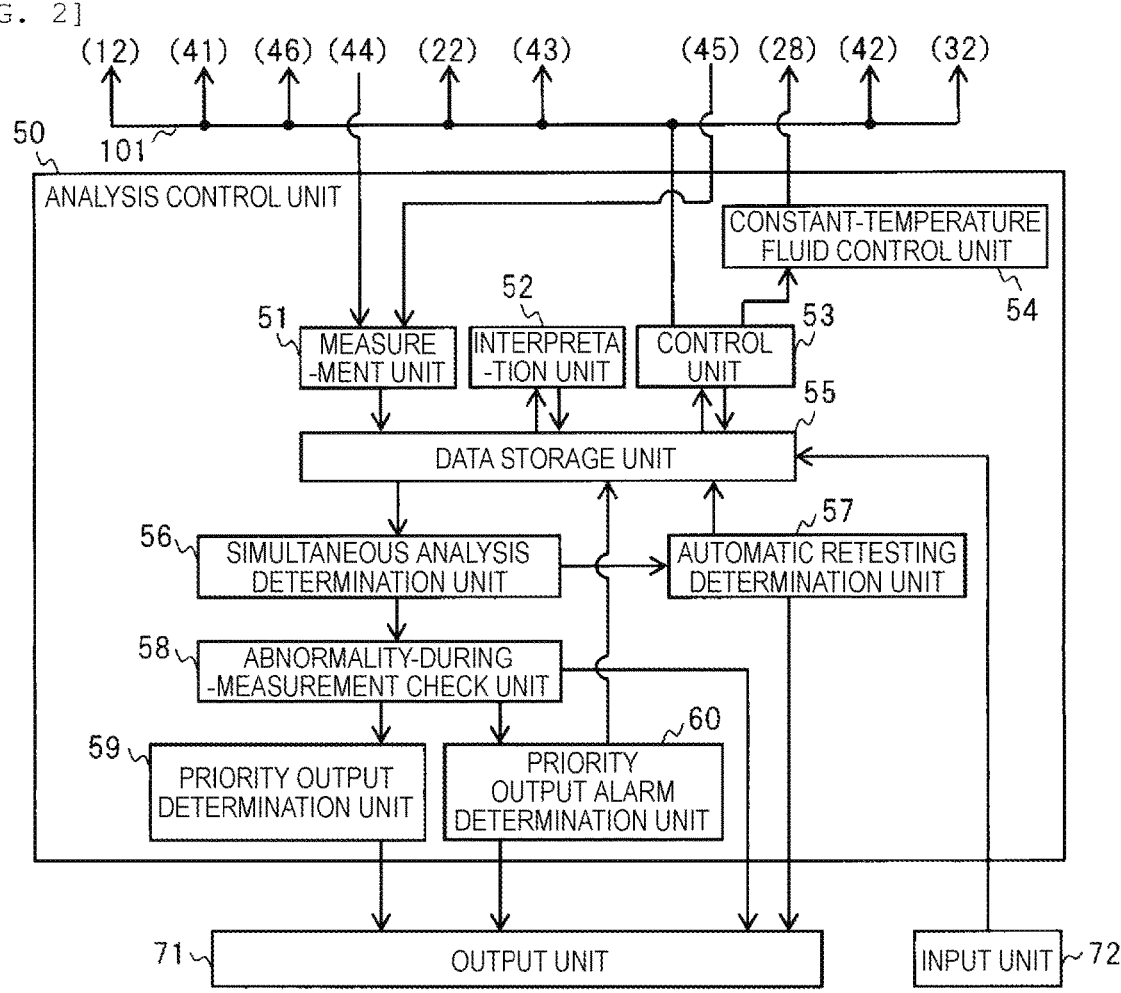
[FIG. 2]

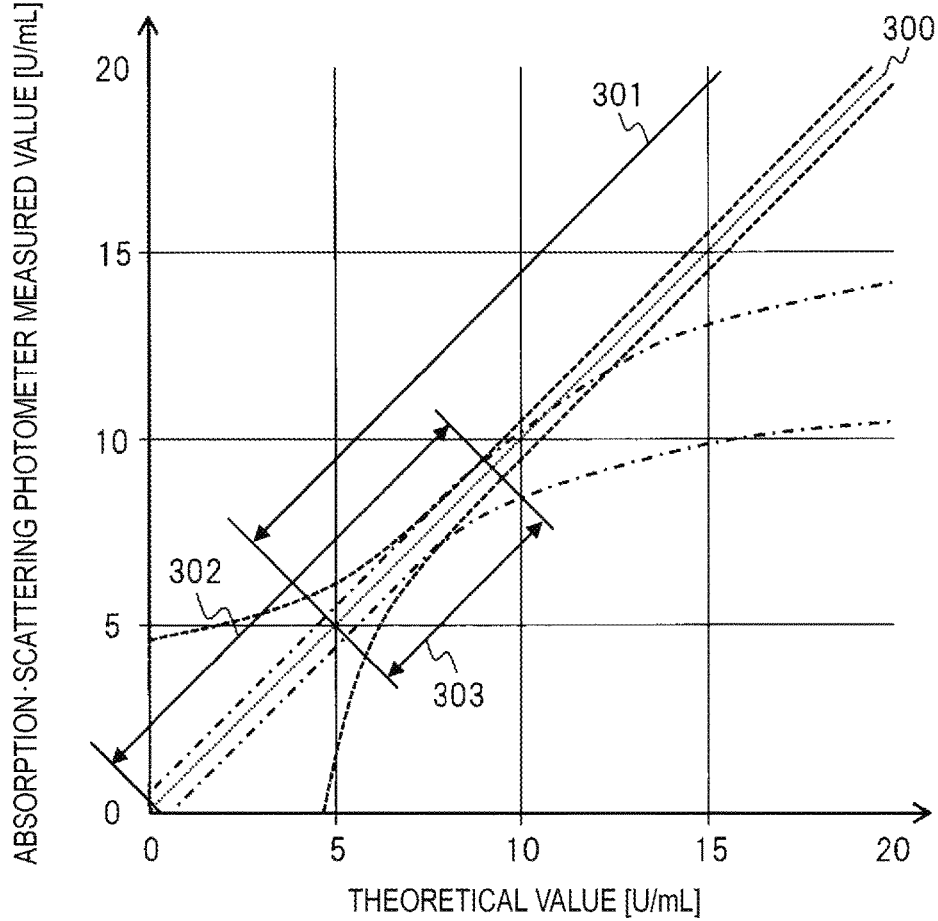

FIG. 4A

DATA ALARM CLASSIFICATION DEFINITION

| HIGH LEVEL(FIRST GROUP) DATA ALARM | |
|---|---|
| ※RETESTING NECESSARY: RETESTING IS IMPOSSIBLE WITHOUT STATE IMPROVEMENT WORK. | |
| 1 (A1) | SAMPLE SHORTAGE |
| 2 (A2) | REAGENT SHORTAGE |
| 3 (A3) | CLOGGING DETECTION |
| 4 (A4) | DETERGENT SHORTAGE |
| 5 (A5) | PHOTOMETER ABNORMALITY |

FIG. 4B

| MIDDLE LEVEL(SECOND GROUP) DATA ALARM | | | | |
|---|---|---|---|---|
| ※RETESTING NECESSARY: RETESTING IS POSSIBLE WITHOUT STATE IMPROVEMENT WORK. | | | | |
| (B-1) REACTION PROCESS ABNORMALITY | | 1 | (B1) | CELL BLANK ABNORMALITY |
| | | 2 | (B2) | ABSORBANCE DIFFERENCE ABNORMALITY |
| | | 3 | (B3) | SCATTERED LIGHT INTENSITY DIFFERENCE ABNORMALITY |
| | | 4 | | CALCULATION IMPOSSIBLE |
| (B-2) SAMPLE CONCENTRATION ABNORMALITY | HIGH CONCENTRATION DETERMINATION | 1 | (B4) | PROZONE |
| | | 2 | (B5) | QUANTITATIVE RANGE UPPER LIMIT OVER |
| | | 3 | | ABSORBANCE·SCATTERED LIGHT INTENSITY OVER |
| | LOW CONCENTRATION DETERMINATION | 4 | (B6) | QUANTITATIVE RANGE LOWER LIMIT OVER |
| | LOW CONCENTRATION DETERMINATION | 5 | | REPEAT UPPER LIMIT |
| | LOW CONCENTRATION DETERMINATION | 6 | | REPEAT LOWER LIMIT |

FIG. 4C

| LOW LEVEL(THIRD GROUP) DATA ALARM | |
|---|---|
| ※NO RETESTING NECESSARY: OUTPUT MEASUREMENT RESULT AS REFERENCE VALUE | |
| 1 (C1) | SERUM INFORMATION |
| 2 (C2) | REAGENT EXPIRATION |
| 3 | SAMPLE CARRYOVER |

FIG. 5A

CORRESPONDENCE TABLE(1)

COMBINATION OF MIDDLE LEVEL DATA ALARMS OF REACTION PROCESS ABNORMALITY(B-1)

| ABSORPTION | | SCATTERING | OUTPUT | RETESTING | CONDITION |
|---|---|---|---|---|---|
| 1 | ABSORBANCE DIFFERENCE ABNORMALITY(B2)/SCATTERED LIGHT INTENSITY DIFFERENCE ABNORMALITY(B3) | 1 ABSORBANCE DIFFERENCE ABNORMALITY(B2)/SCATTERED LIGHT INTENSITY DIFFERENCE ABNORMALITY(B3) | PRIORITY(3) | PRESENCE(1) | SAME(1) |
| | | 2 CELL BLANK ABNORMALITY(B1) | 3 | 1 | 1 |
| | | 3 CALCULATION IMPOSSIBLE | 3 | 1 | 1 |
| 2 | CELL BLANK ABNORMALITY(B1) | 1 B2/B3 | 3 | 1 | 1 |
| | | 2 B1 | 3 | 1 | 1 |
| | | 3 CALCULATION IMPOSSIBLE | 3 | 1 | 1 |
| 3 | CALCULATION IMPOSSIBLE | 1 B2/B3 | 3 | 1 | 1 |
| | | 2 B1 | 3 | 1 | 1 |
| | | 3 CALCULATION IMPOSSIBLE | 3 | 1 | 1 |

FIG. 5B

COMBINATION OF MIDDLE LEVEL DATA ALARMS OF SAMPLE CONCENTRATION ABNORMALITY(B-2)

| ABSORPTION | | SCATTERING | OUTPUT | RETESTING | CONDITION |
|---|---|---|---|---|---|
| 1 | ABSORBANCE·SCATTERED LIGHT INTENSITY OVER | 1 ABSORBANCE·SCATTERED LIGHT INTENSITY OVER | ABSORPTION(1) | PRESENCE(1) | DECREASE(2) |
| | | 2 PROZONE(B4) | 1 | 1 | 2 |
| | | 3 QUANTITATIVE RANGE UPPER LIMIT OVER(B5) | 1 | 1 | 2 |
| | | 4 QUANTITATIVE RANGE LOWER LIMIT OVER(B6) | 1 | 1 | 2 |
| 2 | PROZONE(B4) | 1 ABSORBANCE·SCATTERED LIGHT INTENSITY OVER | 1 | 1 | 2 |
| | | 2 B4 | 1 | 1 | 2 |
| | | 3 B5 | 1 | 1 | 2 |
| | | 4 B6 | 1 | 1 | 2 |
| 3 | QUANTITATIVE RANGE UPPER LIMIT OVER(B5) | 1 ABSORBANCE·SCATTERED LIGHT INTENSITY OVER | 1 | 1 | 2 |
| | | 2 B4 | 1 | 1 | 2 |
| | | 3 B5 | 1 | 1 | 2 |
| | | 4 B6 | 1 | 1 | 2 |
| 4 | QUANTITATIVE RANGE LOWER LIMIT OVER(B6) | 1 ABSORBANCE·SCATTERED LIGHT INTENSITY OVER | 1 | 1 | INCREASE(3) |
| | | 2 B4 | 1 | 1 | 3 |
| | | 3 B5 | 1 | 1 | 3 |
| | | 4 B6 | SCATTERING(2) | 1 | 3 |

[FIG. 6]

CORRESPONDENCE TABLE(2)

COMBINATION OF MIDDLE LEVEL REACTION PROCESS ABNORMALITY(B-1) AND SAMPLE CONCENTRATION ABNORMALITY(B-2)

| | ABSORPTION | | SCATTERING | OUTPUT | RETESTING | CONDITION |
|---|---|---|---|---|---|---|
| 1 | ABSORBANCE DIFFERENCE ABNORMALITY(B2)/SCATTERED LIGHT INTENSITY DIFFERENCE ABNORMALITY(B3) | 1 | ABSORBANCE · SCATTERED LIGHT INTENSITY OVER | ABSORPTION(1) | PRESENCE(1) | SAME(1) |
| | | 2 | PROZONE(B4) | 1 | 1 | 1 |
| | | 3 | QUANTITATIVE RANGE UPPER LIMIT OVER(B5) | 1 | 1 | 1 |
| | | 4 | QUANTITATIVE RANGE LOWER LIMIT OVER(B6) | SCATTERING(2) | 1 | INCREASE(3) |
| 2 | CELL BLANK ABNORMALITY (B1) | 1 | ABSORBANCE · SCATTERED LIGHT INTENSITY OVER | 1 | 1 | 1 |
| | | 2 | B4 | 1 | 1 | 1 |
| | | 3 | B5 | 1 | 1 | 1 |
| | | 4 | B6 | 2 | 1 | 3 |
| 3 | CALCULATION IMPOSSIBLE | 1 | ABSORBANCE · SCATTERED LIGHT INTENSITY OVER | 1 | 1 | 1 |
| | | 2 | B4 | 1 | 1 | 1 |
| | | 3 | B5 | 1 | 1 | 1 |
| | | 4 | B6 | 2 | 1 | 3 |
| 4 | ABSORBANCE · SCATTERED LIGHT INTENSITY OVER | 1 | ABSORBANCE DIFFERENCE ABNORMALITY(B2)/ LIGHT INTENSITY DIFFERENCE ABNORMALITY(B3) | 1 | 1 | DECREASE(2) |
| | | 2 | CELL BLANK ABNORMALITY(B1) | 1 | 1 | 2 |
| | | 3 | CALCULATION IMPOSSIBLE | 1 | 1 | 2 |
| 5 | PROZONE(B4) | 1 | B2/B3 | 1 | 1 | 2 |
| | | 2 | B1 | 1 | 1 | 2 |
| | | 3 | CALCULATION IMPOSSIBLE | 1 | 1 | 2 |
| 6 | QUANTITATIVE RANGE UPPER LIMIT OVER(B5) | 1 | B2/B3 | 1 | 1 | 2 |
| | | 2 | B1 | 1 | 1 | 2 |
| | | 3 | CALCULATION IMPOSSIBLE | 1 | 1 | 2 |
| 7 | QUANTITATIVE RANGE LOWER LIMIT OVER(B6) | 1 | B2/B3 | 1 | 1 | 3 |
| | | 2 | B1 | 1 | 1 | 3 |
| | | 3 | CALCULATION IMPOSSIBLE | 1 | 1 | 3 |

[FIG. 7]

CORRESPONDENCE TABLE(3)

COMBINATION OF MIDDLE LEVEL REACTION PROCESS ABNORMALITY(B-1) AND LOW LEVEL DATA ALARM

| | ABSORPTION | | SCATTERING | OUTPUT | RETESTING | CONDITION |
|---|---|---|---|---|---|---|
| 1 | ABSORBANCE DIFFERENCE ABNORMALITY(B2)/SCATTERED LIGHT INTENSITY DIFFERENCE ABNORMALITY(B3) | 1 | SERUM INFORMATION(C1) | SCATTERING(2) | ABSENCE(2) | – |
| | | 2 | SAMPLE CARRYOVER | 2 | 2 | – |
| | | 3 | REAGENT EXPIRATION(C2) | 2 | 2 | – |
| 2 | CELL BLANK ABNORMALITY(B1) | 1 | C1 | 2 | 2 | – |
| | | 2 | SAMPLE CARRYOVER | 2 | 2 | – |
| | | 3 | C2 | 2 | 2 | – |
| 3 | CALCULATION IMPOSSIBLE | 1 | C1 | 2 | 2 | – |
| | | 2 | SAMPLE CARRYOVER | 2 | 2 | – |
| | | 3 | C2 | 2 | 2 | – |
| 4 | SERUM INFORMATION(C1) | 1 | ABSORBANCE DIFFERENCE ABNORMALITY(B2) / LIGHT INTENSITY DIFFERENCE ABNORMALITY(B3) | ABSORPTION(1) | 2 | – |
| | | 2 | CELL BLANK ABNORMALITY(B1) | c | 2 | – |
| | | 3 | CALCULATION IMPOSSIBLE | 2 | 2 | – |
| 5 | SAMPLE CARRYOVER | 1 | B2/B3 | 2 | 2 | – |
| | | 2 | B4 | 2 | 2 | – |
| | | 3 | CALCULATION IMPOSSIBLE | 2 | 2 | – |
| 6 | REAGENT EXPIRATION(C2) | 1 | B2/B3 | 2 | 2 | – |
| | | 2 | B4 | 2 | 2 | – |
| | | 3 | CALCULATION IMPOSSIBLE | 2 | 2 | – |

[FIG. 8]

CORRESPONDENCE TABLE(4)

COMBINATION OF MIDDLE LEVEL SAMPLE CONCENTRATION ABNORMALITY(B-1) AND LOW LEVEL DATA ALARM

| | ABSORPTION | | SCATTERING | OUTPUT | RETESTING | CONDITION |
|---|---|---|---|---|---|---|
| 1 | ABSORBANCE · SCATTERED LIGHT INTENSITY OVER | 1 | SERUM INFORMATION(C1) | ABSORPTION(1) | PRESENCE(1) | DECREASE(2) |
| | | 2 | SAMPLE CARRYOVER | 1 | 1 | 2 |
| | | 3 | REAGENT EXPIRATION(C2) | 1 | 1 | 2 |
| 2 | PROZONE(B4) | 1 | C1 | 1 | 1 | 2 |
| | | 2 | SAMPLE CARRYOVER | 1 | 1 | 2 |
| | | 3 | C2 | 1 | 1 | 2 |
| 3 | QUANTITATIVE RANGE UPPER LIMIT OVER(B5) | 1 | C1 | 1 | 1 | 2 |
| | | 2 | SAMPLE CARRYOVER | 1 | 1 | 2 |
| | | 3 | C2 | 1 | 1 | 2 |
| 4 | QUANTITATIVE RANGE LOWER LIMIT OVER(B6) | 1 | C1 | SCATTERING(2) | ABSENCE(2) | -- |
| | | 2 | SAMPLE CARRYOVER | 2 | 2 | -- |
| | | 3 | C2 | 2 | 2 | -- |
| 7 | SERUM INFORMATION(C1) | 1 | ABSORBANCE · SCATTERED LIGHT INTENSITY OVER | 1 | 2 | -- |
| | | 2 | PROZONE(B4) | 1 | 2 | -- |
| | | 3 | QUANTITATIVE RANGE UPPER LIMIT OVER(B5) | 1 | 2 | -- |
| | | 4 | QUANTITATIVE RANGE LOWER LIMIT OVER(B6) | 2 | 1 | INCREASE(3) |
| 8 | SAMPLE CARRYOVER | 1 | ABSORBANCE · SCATTERED LIGHT INTENSITY OVER | 1 | 2 | -- |
| | | 2 | B4 | 1 | 2 | -- |
| | | 3 | B5 | 1 | 2 | -- |
| | | 4 | B6 | 2 | 1 | 3 |
| 9 | REAGENT EXPIRATION(C2) | 1 | ABSORBANCE · SCATTERED LIGHT INTENSITY OVER | 1 | 2 | -- |
| | | 2 | B4 | 1 | 2 | -- |
| | | 3 | B5 | 1 | 2 | -- |
| | | 4 | B6 | 2 | 1 | 3 |

[FIG. 9]
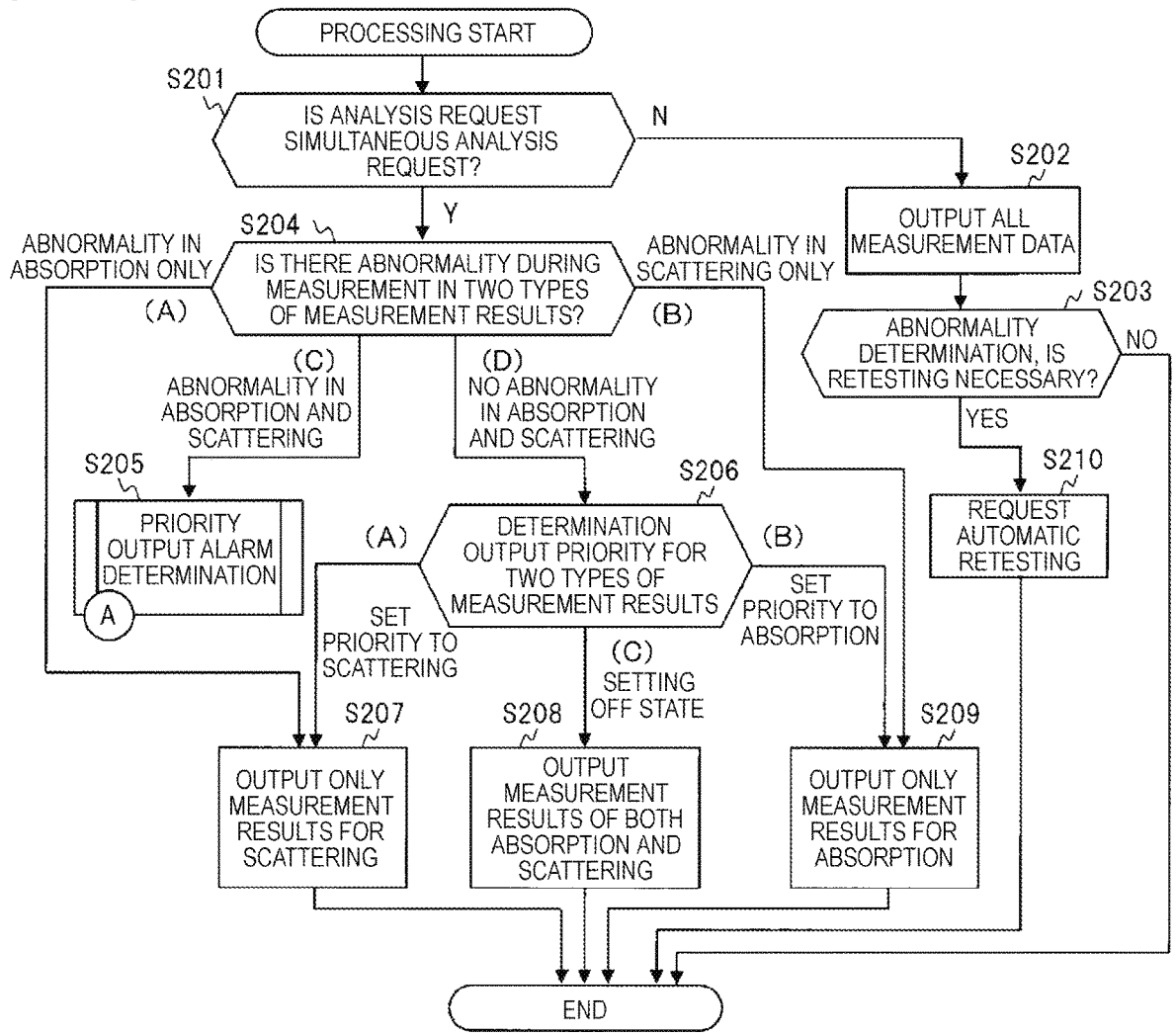

[FIG. 10]
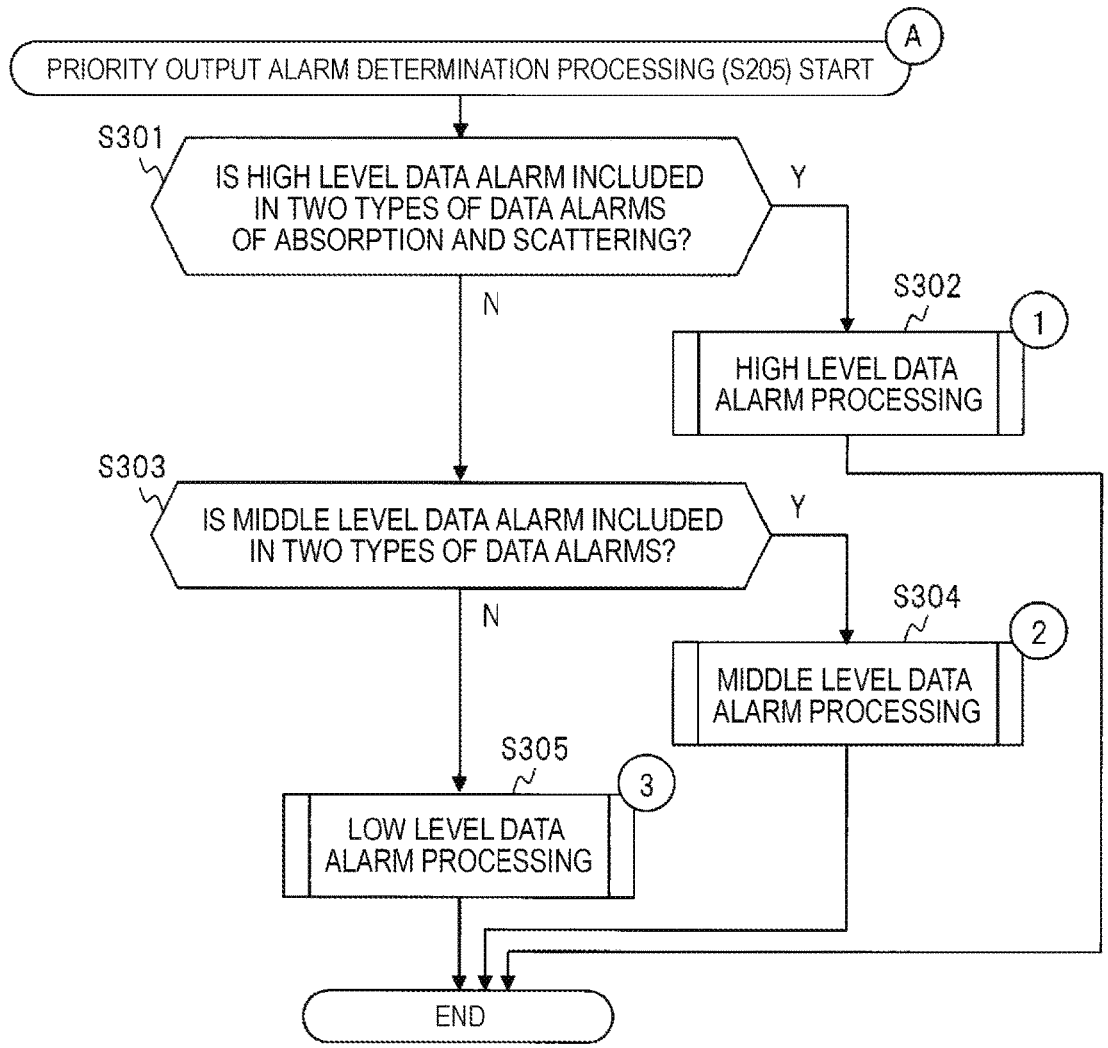

[FIG. 11]
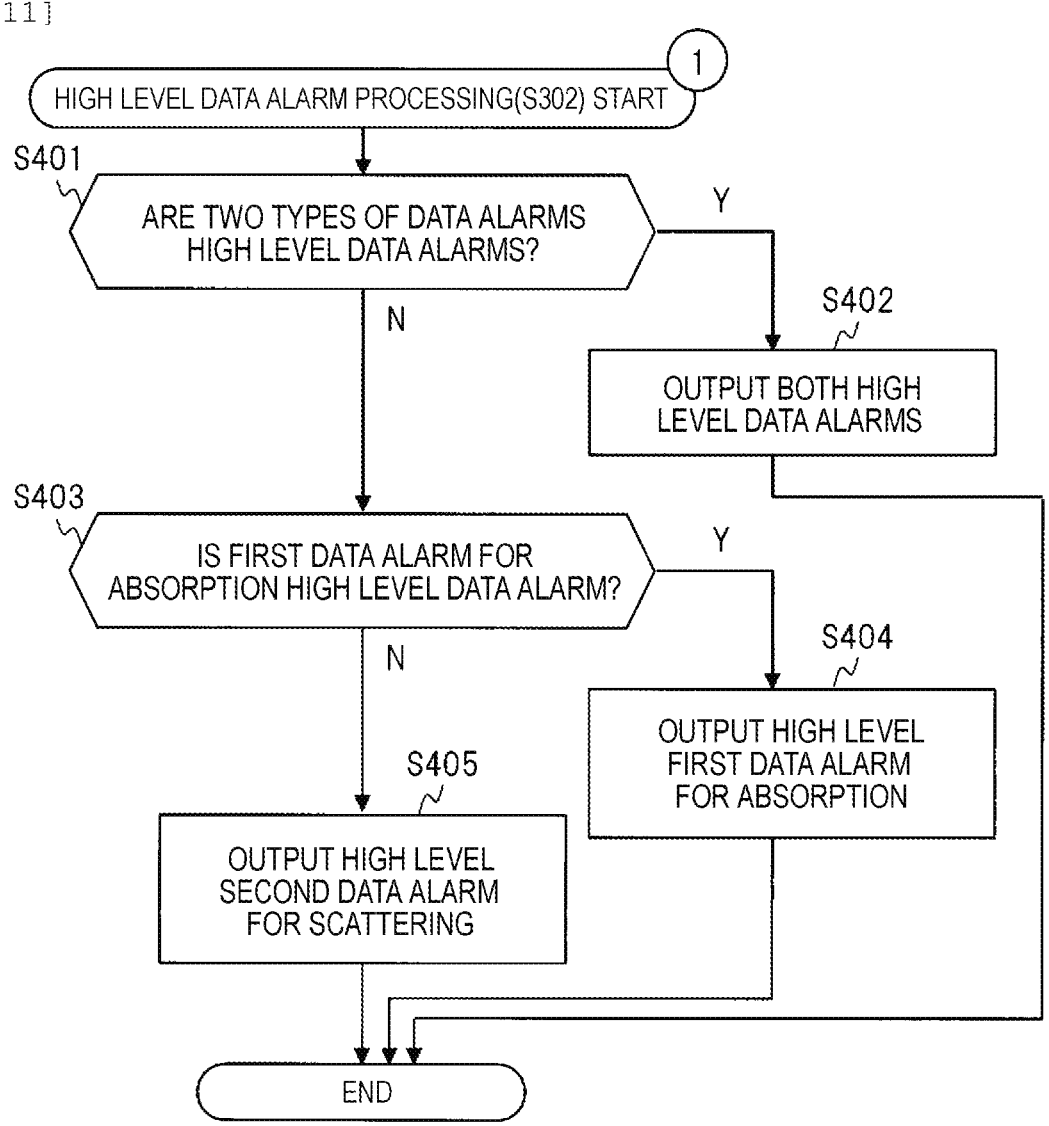

[FIG. 12]
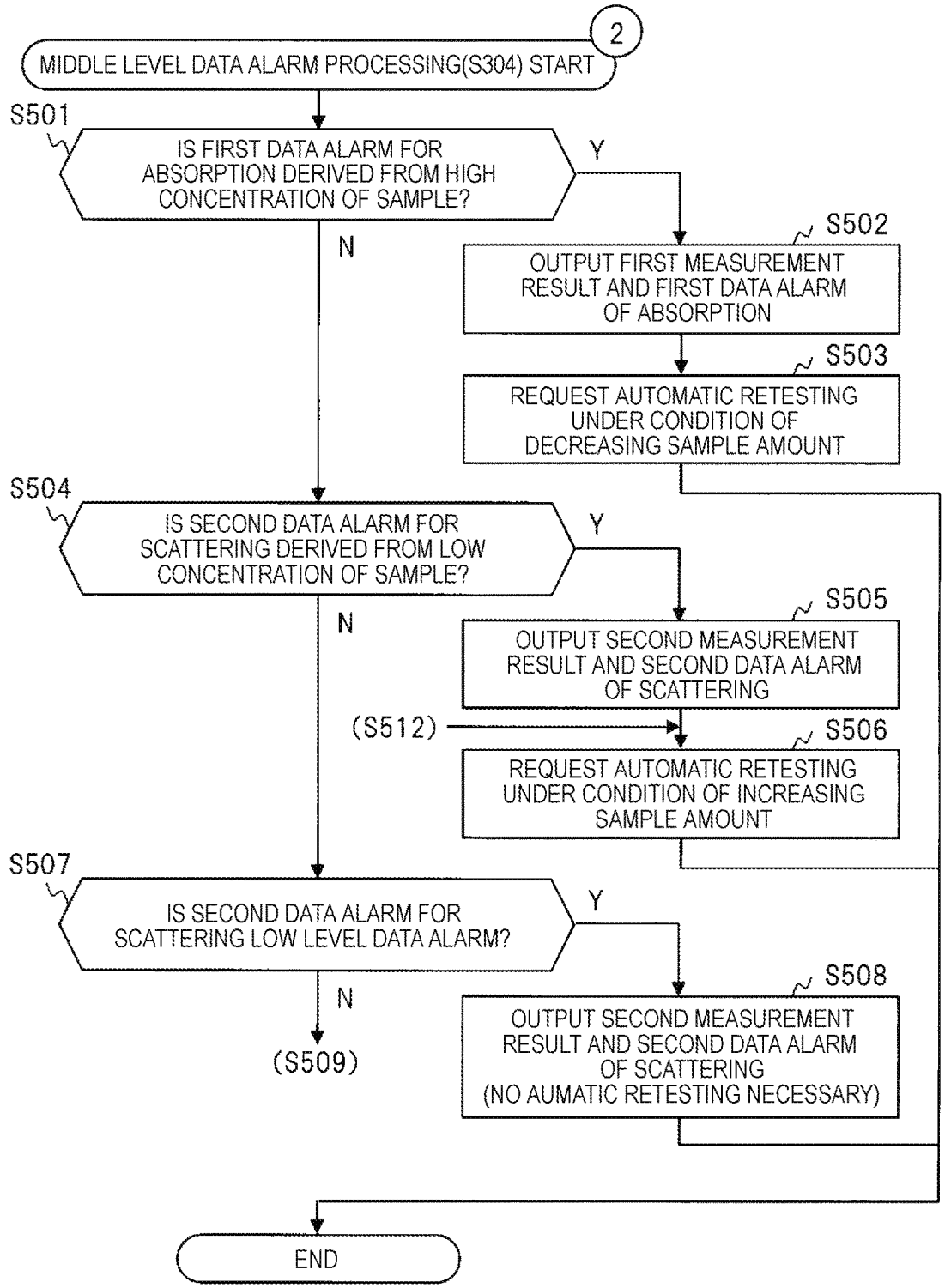

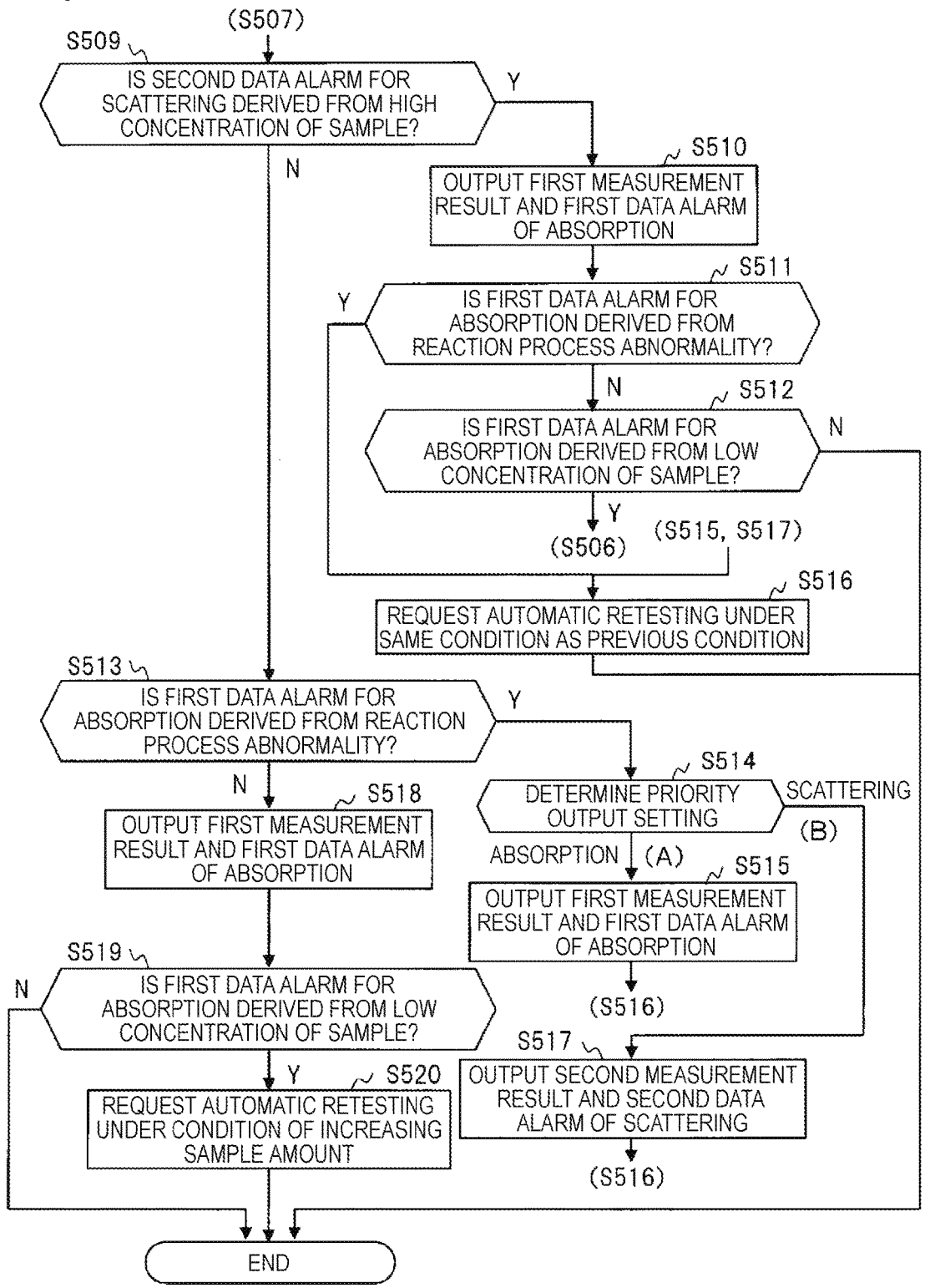
[FIG. 13]

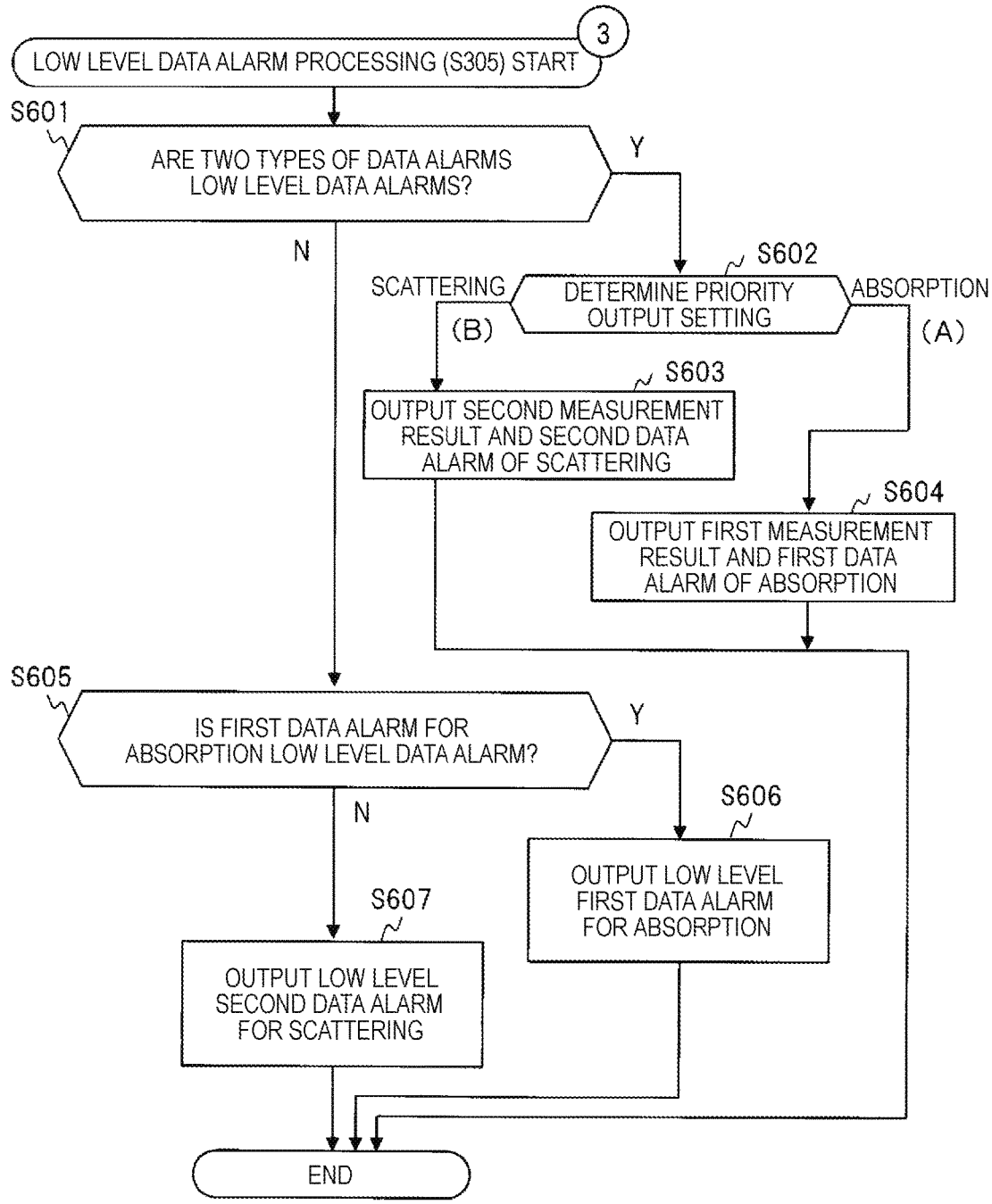
[FIG. 14]

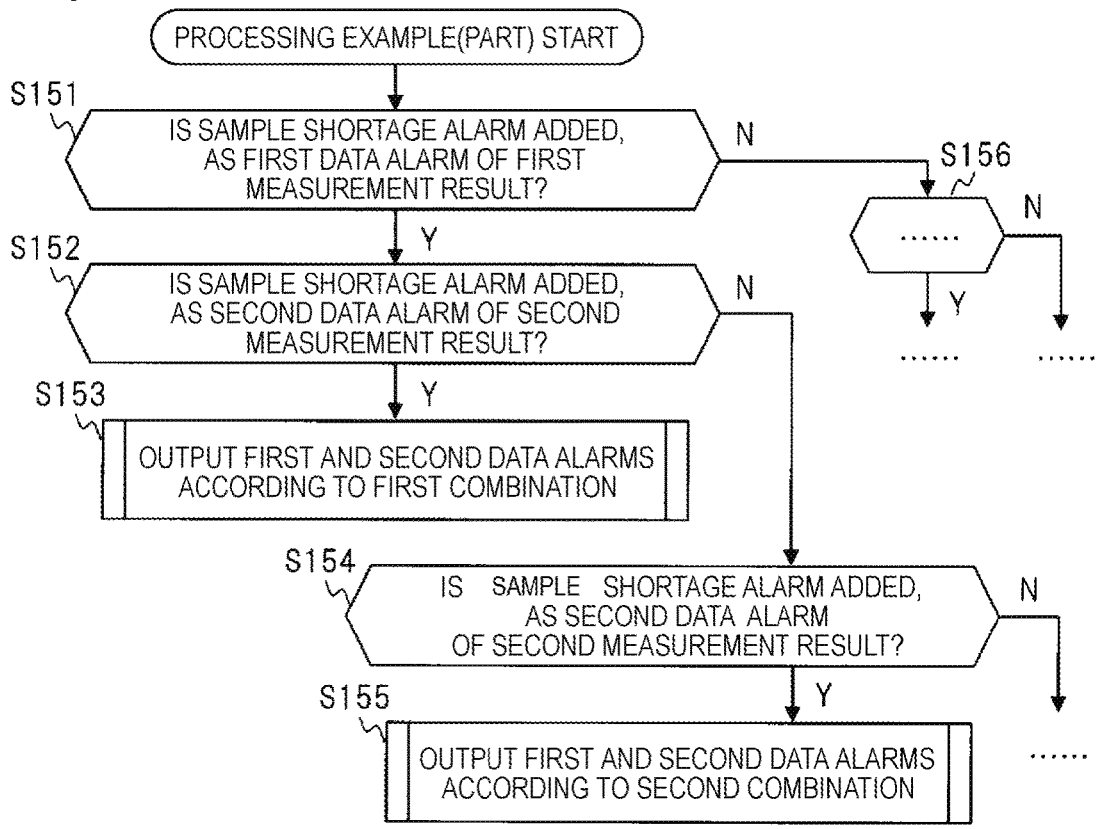

[FIG. 16]
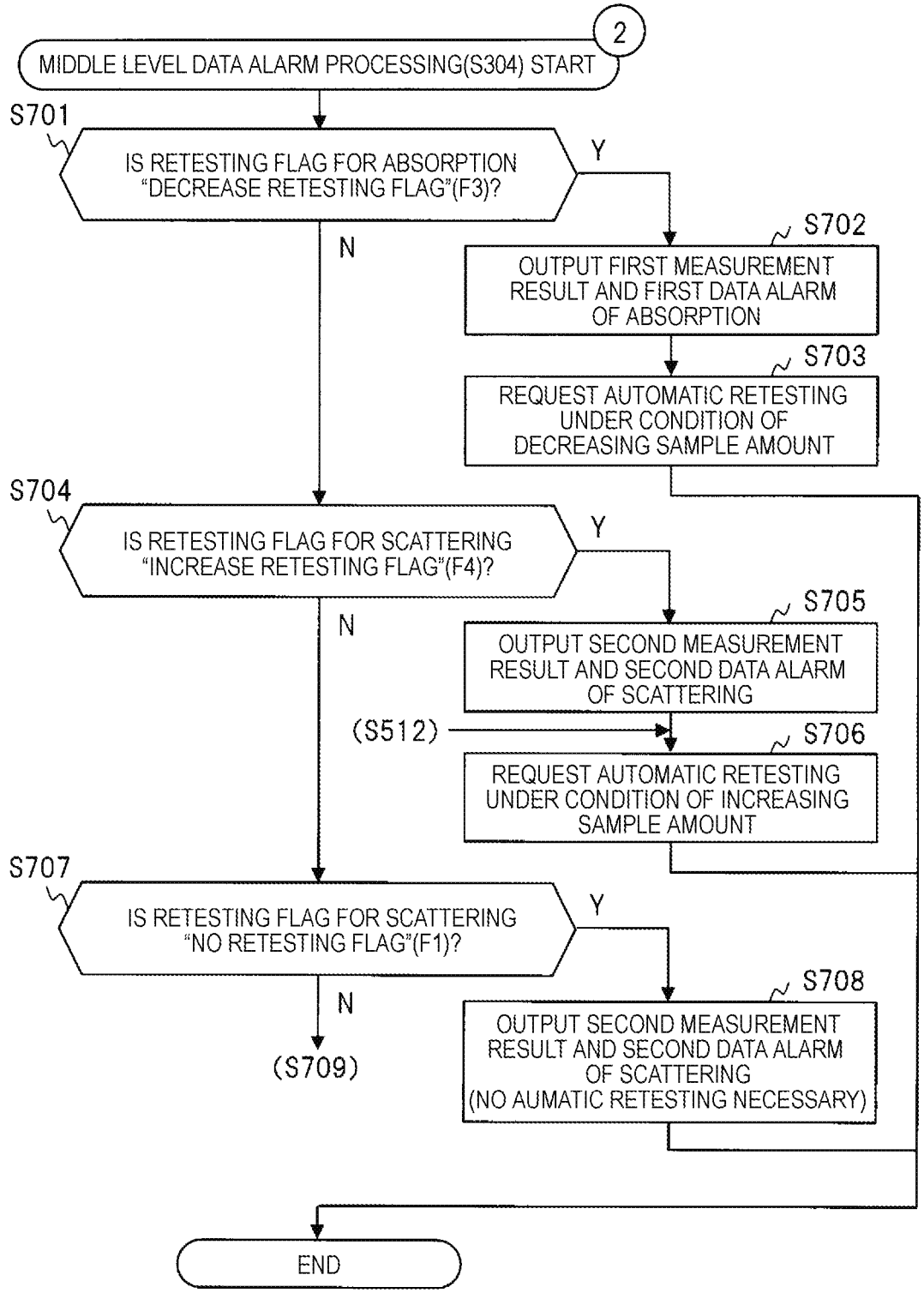

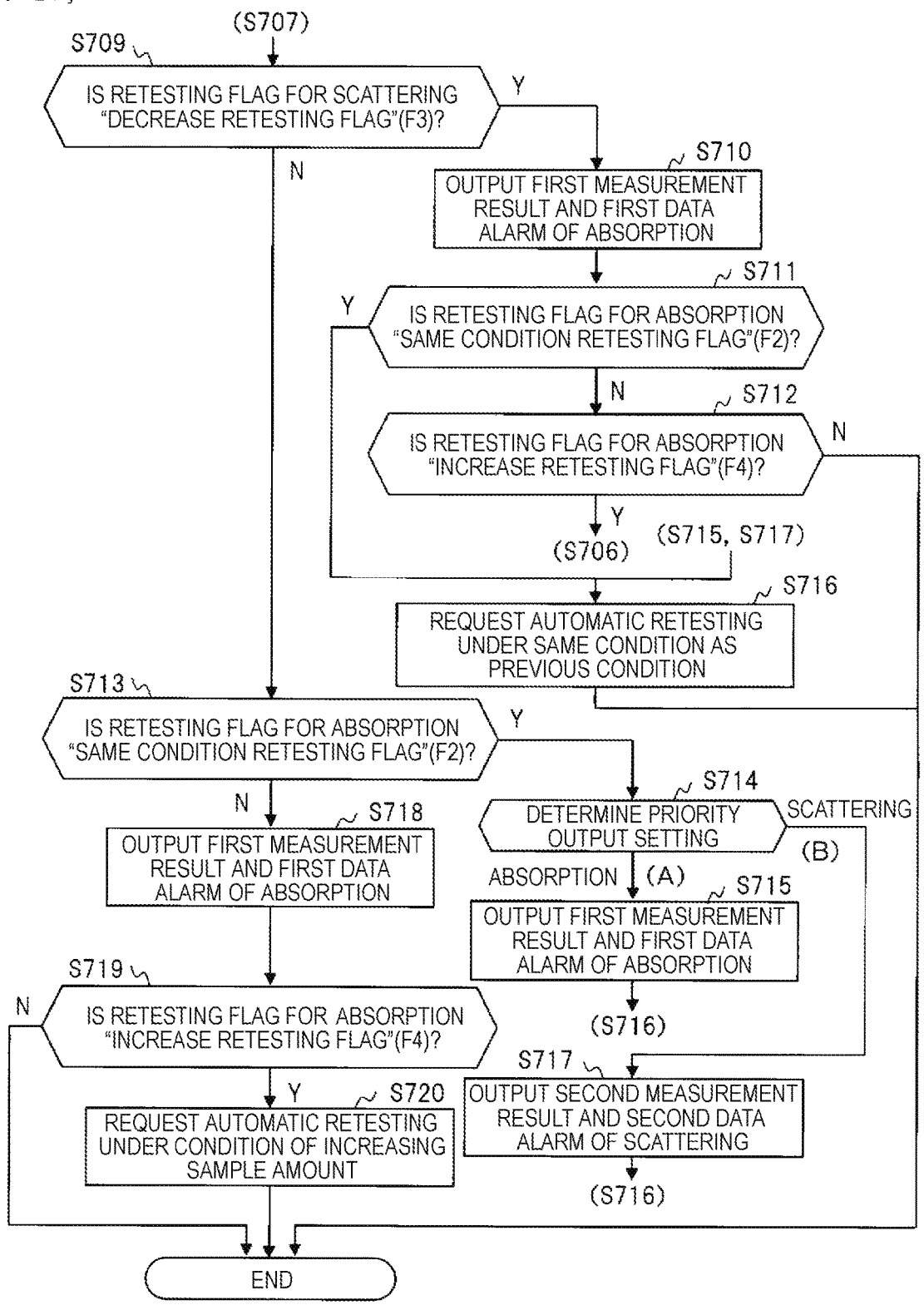
[FIG. 17]

AUTOMATED ANALYZER AND AUTOMATED ANALYSIS METHOD

TECHNICAL FIELD

The present invention relates to a technique of an automated analyzer for a clinical test. The present invention also relates to a technique for outputting an alarm according to an abnormality or an error in the automated analyzer.

BACKGROUND ART

An automated analyzer for clinical test detects a concentration and component amount of a target component substance contained in a sample (also referred to as a specimen) such as blood or urine based on optical measurement. As a method for detecting the target component substance, an absorption photometry for measuring the amount of transmitted light of a sample is often used. In the absorption photometry, the absorbance is calculated by irradiating a sample or a reaction liquid (mixture liquid of a sample and a reagent) with light from a light source and measuring the amount of transmitted light of one or more wavelengths obtained as a result. In the absorption photometry, the amount of the target component substance is obtained from a relationship between the absorbance and the concentration according to Lambert-Beer's law.

As the automated analyzer for clinical test, for example, an automated analyzer that realizes high sensitivity of immunoassay by using a light scattering detection method that uses a change in the amount of scattered light that makes it easier to catch a larger change in the amount of light is known. In the light scattering detection method, an aggregate formed by an antigen-antibody reaction is irradiated with light and at least one of the amount of light and light intensity of the scattered light scattered by the aggregate is measured. Then, in the light scattering detection method, the component amount of the target component substance is obtained from the relationship between the light amount or light intensity and the concentration.

There are differences in characteristics, which includes a range (may be referred to as "quantitative range") in which measurement and quantification are possible, between an absorption photometer that is a photometer using absorption photometry and a scattering photometer that is a photometer that uses a light scattering detection method. Therefore, in recent years, an automated analyzer has been developed in which two types of photometers are mounted on one unit to expand a dynamic range of measurement by utilizing the difference in characteristics between the two types of photometers.

JP-A-2014-6160 (PTL 1) is included as an example of the prior art relating to the automated analyzer. PTL 1 describes that an optimum photometer can be determined as an automated analyzer according to a concentration range among a scattering photometer and an absorption photometer.

CITATION LIST

Patent Literature

PTL 1: JP-A-2014-6160

SUMMARY OF INVENTION

Technical Problem

By the way, many automated analyzers for clinical test have a function of outputting the following alarm (which may be referred to as a data alarm function) in order to increase reliability of a measurement result. In this function, an abnormality or an error during measurement is monitored, and when the abnormality is detected, predetermined data representing a type of the abnormality or the like is added to measurement result information as a data alarm and output.

When the abnormality or the like at the time of measurement is minor, it is highly possible that an appropriate measurement result can be obtained by performing remeasurement or the like after taking measures such as dilution of the sample. For that reason, an automated analyzer having a function (may be referred to as automatic retesting function) of automatically performing retesting including remeasurement in response to the abnormality or the like has been developed.

For example, in the automated analyzer of PTL 1, a method of selecting an output from measurement results of two types of photometers in the case of normal measurement, in other words, when no abnormality or the like is detected, is disclosed. However, in an automated analyzer including two or more types of photometers, a data alarm function, and a function of selecting a measurement result, matters about how to select an output from two or more types of measurement results and data alarms when there is an abnormality or the like at the time of measurement is suitable are not yet studied. For example, in such an apparatus, when performing analysis using two types of photometers, an abnormality or the like may be detected in the measurement of each photometer, and a data alarm may be added to both of the two types of measurement results. That is, a plurality of data alarms of two or more types may occur at the same time. In that case, it is unknown how to select the output for the user is suitable.

In the automated analyzer described above, in any of the cases where either all of a plurality of types of measurement results and data alarms are output or one measurement result and data alarm are selected and output, it may be difficult for the user to make a judgment. As a user, it is difficult to understand what state or meaning the output represents, and it is necessary to judge whether the measurement is correct or not, whether the measurement is appropriate, and whether retesting or coping work is necessary or not, and the like, and the user needs to perform work or operation according to the judgment. That is, in the automated analyzer, the user's load on the output is large, and there is a possibility that a judgment error, a result report delay, or the like may occur.

In the automated analyzer described above, when considering a combination with the automatic retesting function, matters about how to control remeasurement is suitable when a plurality of data alarms of more than two types occur are not yet studied, and the automatic retesting function cannot be effectively used.

An object of the present invention is to provide a technique capable of realizing a suitable output from measurement results of a plurality of photometers and data alarms even if there is an abnormality or the like at the time of measurement, for a technique of an automated analyzer including a plurality of photometers of two or more types. That is, the object of the present invention is to provide a technique capable of reducing a user's load on output and preventing a judgment error, a result report delay, and the like. Another object of the present invention is to provide a technique capable of realizing more accurate measurement at high speed by suitable remeasurement control even in the case of an automated analyzer having automatic retesting function.

Solution to Problem

A representative embodiment of the present invention is an automated analyzer having the following configuration. An automated analyzer according to one embodiment includes a plurality of types of a plurality of photometers having different quantitative ranges, and an analysis control unit configured to control analysis including measurement using the plurality of photometers for a target sample, in which the analysis control unit is configured to acquire a plurality of measurement results including a plurality of measurement values using the plurality of photometers, when an abnormality is detected during the measurement using the plurality of photometers, add a data alarm according to a type of the abnormality to a measurement result using a corresponding photometer among the plurality of measurement results, when a plurality of data alarms are added to the plurality of measurement results, select a measurement result and a data alarm to be output corresponding to a combination of the plurality of data alarms from the plurality of measurement results and the plurality of data alarms, and output the selected measurement result and data alarm to a user as an analysis result.

Advantageous Effects of Invention

According to a representative embodiment of the present invention, regarding the technology of an automated analyzer including a plurality of photometers of two or more types, even if there is an abnormality or the like at the time of measurement, suitable output from the measurement results of the plurality of photometers and data alarms can be realized. That is, the user's load on the output can be reduced, and a judgment error, a result report delay, and the like can be prevented. According to the representative embodiment, even in the case of an automated analyzer having automatic retesting function, more accurate measurement can be realized at high speed by suitable remeasurement control.

BRIEF DESCRIPTION OF DRAWINGS

FIG. 1 is a diagram illustrating an overall schematic configuration of an automated analyzer according to Embodiment 1 of the present invention.

FIG. 2 is a diagram mainly illustrating a functional block configuration of an analysis control unit in the automated analyzer according to Embodiment 1.

FIG. 3 is a diagram illustrating characteristics of two types of photometers in the automated analyzer according to Embodiment 1.

FIGS. 4A to 4C are diagrams illustrating a table of classification definitions of data alarms in the automated analyzer according to Embodiment 1.

FIGS. 5A and 5B are diagrams illustrating a first part as a correspondence table between data alarms and outputs in the automated analyzer according to Embodiment 1.

FIG. 6 is a diagram illustrating a second part as the correspondence table in the automated analyzer according to Embodiment 1.

FIG. 7 is a diagram illustrating a third part as the correspondence table in the automated analyzer according to Embodiment 1.

FIG. 8 is a diagram illustrating a fourth part as the correspondence table in the automated analyzer according to Embodiment 1.

FIG. 9 is a diagram illustrating a flow of output control processing in the automated analyzer according to Embodiment 1.

FIG. 10 is a diagram illustrating a flow of priority output alarm determination processing in Embodiment 1.

FIG. 11 is a diagram illustrating a flow of high level data alarm processing in Embodiment 1.

FIG. 12 is a diagram illustrating a flow of a first part of a middle level data alarm processing in Embodiment 1.

FIG. 13 is a diagram illustrating a flow of a second part of the middle level data alarm processing in Embodiment 1.

FIG. 14 is a diagram illustrating a flow of low level data alarm processing in Embodiment 1.

FIG. 15 is a diagram illustrating an example of a processing flow in an automated analyzer according to Embodiment 2 of the present invention.

FIG. 16 is a diagram illustrating a flow of a first part of middle level data alarm processing in an automated analyzer according to Embodiment 3 of the present invention.

FIG. 17 is a diagram illustrating a flow of a second part of the middle level data alarm processing in Embodiment 3.

DESCRIPTION OF EMBODIMENTS

Hereinafter, embodiments of the present invention will be described in detail with reference to the drawings. In all the drawings for describing the embodiments, the same portions are denoted by the same reference numerals in principle, and the repeated description thereof will be omitted.

[Problems and the Like]

Supplementary explanations on assumptions, problems, and the like are given. A reaction between a sample and a reagent is roughly classified into two types of reactions of a color reaction and an agglutination reaction. The color reaction is a reaction between a substrate and an enzyme, and is used in biochemical analysis. In biochemical analysis, the amount of light absorbed by a colored reaction liquid (represented as absorbance) is measured to determine a component amount. The agglutination reaction is a reaction between an antigen and an antibody and is used in immunoassay. In the immunoassay, the cloudiness (represented as turbidity) of the reaction liquid, which changes due to aggregation of the antigen and the antibody, is measured from the change in the amount of transmitted light to determine the component amount. The target component substance measured by the immunoassay usually has a low blood concentration, and a highly sensitive detection system is required. For that reason, latex immunity nephelometry and the like have been developed for immunoassay. In the latex immunity nephelometry, a change in turbidity is increased by increasing the size of an aggregate formed by an antigen-antibody reaction using a reagent in which antibodies or antigens are sensitized and bound to the surface of latex particles, thereby enabling highly sensitive measurement.

The light scattering detection method generally has high detection sensitivity and good quantitative property for low-concentration samples, but has many agglomerates and has poor quantitative property due to the influence of multiple scattering, for high-concentration samples. On the other hand, the absorption photometry generally does not have high detection sensitivity for low-concentration samples, but has better quantitative properties and a wider range of concentrations that can be quantified, for high-concentration samples, than the light scattering detection method. As described above, there are differences in characteristics, which include the range in which measurement and quantification are possible, between an absorption photometer that is a photometer using absorption photometry and a scattering photometer that is a photometer that uses a light scattering detection method. Therefore, in recent years, an automated analyzer has been developed in which two types of photometers are mounted on one unit to expand the dynamic range of measurement by utilizing the difference in characteristics between the two types of photometers. In this automated analyzer, for example, a measurement result of the scattering photometer is used in a low concentration region, and a measurement result of the absorption photometer is used in a high concentration region.

PTL 1 discloses a method for selecting a high-sensitivity photometer from dispersion of measured values of a standard solution used for creating a calibration curve of each photometer with respect to the selection criteria of the photometer. A method is disclosed in which a plurality of concentration ranges are set in advance and two types of photometers are switched according to a concentration range to which the measured value of the photometer belongs.

As an automated analyzer of a comparative example with respect to the embodiment of the present invention, an automated analyzer including an absorption photometer using an absorption photometry and a scattering photometer using a light scattering detection method as two types of conventional photometers is considered. It is assumed that this automated analyzer has a simultaneous analysis function which is a function of performing measurement and analysis simultaneously using two types of photometers. It is assumed that this automated analyzer has a data alarm function which is a function of adding a data alarm to a measurement result according to detection of an abnormality or the like at the time of measurement. It is assumed that the automated analyzer has a function of selecting and outputting one of the suitable measurement results based on a predetermined judgment from the measurement results of the two types of photometers at the time of simultaneous analysis. As a criterion and a method for selecting the output, for example, a method of selecting a measurement result of a photometer having a suitable quantitative range for the concentration of the target sample is included.

However, in the automated analyzer according to the comparative example, if there is an abnormality or the like at the time of measurement during the simultaneous analysis, two types of data alarms may occur according to the two types of measurement results. The measurement results and the data alarms can be independently obtained by the absorption photometer and the scattering photometer. In this case, conventionally, matters about how to select a measurement result and a data alarm to be output from the two types of the measurement results and the data alarms is suitable are not yet studied. When the two types of measurement results and the data alarms described above occur in the apparatus of the comparative example, selecting and outputting the measurement result and the data alarm with lower reliability is undesirable because it leads to a judgment error, a result report delay of a user, and the like.

Embodiment 1

The automated analyzer and the automated analysis method according to Embodiment 1 of the present invention will be described with reference to FIGS. 1 to 14. The automated analysis method according to Embodiment 1 is a method having steps executed in the automated analyzer according to Embodiment 1.

The automated analyzer according to Embodiment 1 includes an absorption photometer and a scattering photometer as two types of photometers, and has a data alarm function, a simultaneous analysis function, and the like. The data alarm function is a function of, when an abnormality or the like at the time of measurement is detected, adding a data alarm according to the abnormality or the like to the measurement result. The simultaneous analysis function is a function of simultaneously performing measurement and analysis ("simultaneous absorption and scattering analysis") using two types of photometers. The automated analyzer according to Embodiment 1 has a function of selecting a suitable measurement result from a plurality of measurement results according to a target component substance of a test item and a suitable quantitative range of various photometers at the time of simultaneous analysis, and is capable of performing measurement in a wide dynamic range.

The automated analyzer according to Embodiment 1 has a function of suitably selecting and outputting (may be referred to as an output control function) a measurement result and a data alarm even when two types of measurement results and data alarms are obtained according to an abnormality or the like at the time of measurement during simultaneous analysis. In this function, a measurement result, a data alarm, and the like to be output are suitably selected according to a combination of data alarms. The measurement results include quantitative values such as measured values and calculated values, signal values, analysis result information, and the like.

Furthermore, the automated analyzer according to Embodiment 1 also has an automatic retesting function, and even when two types of measurement results and data alarms are obtained as described above, automatic retesting is suitably controlled by the output control function described above in the automated analyzer. That is, the automated analyzer according to Embodiment 1 suitably selects an output measurement result, a data alarm, and automatic retesting information to be output according to a combination of data alarms, and controls automatic remeasurement and the like. The automatic retesting information includes the necessity of automatic retesting, identification information of a photometer to be used, a remeasurement condition (for example, a condition such as dilution of a sample), and the like.

[Automated Analyzer]

FIG. 1 illustrates the overall schematic configuration of an automated analyzer 1 according to Embodiment 1. The automated analyzer 1 includes a sample disk 10, a reaction disk 20, a reagent disk 30, a sample dispensing mechanism 41, a reagent dispensing mechanism 42, a computer 100, an interface circuit 101, and the like. The sample disk 10 includes a drive unit 12. The reaction disk 20 includes a drive unit 22. The reagent disk 30 includes a drive unit 32. Two types of photometers, an absorption photometer 44 and a scattering photometer 45 are installed in the reaction disk 20. A thermostatic bath 28 is installed in the reaction disk 20. A stirring unit 43, a cleaning unit 46, and the like are installed in the reaction disk 20.

The computer 100 includes an analysis control unit 50, a storage unit 70, an output unit 71, an input unit 72, and the like. The analysis control unit 50 is connected to each drive unit and each mechanism through the interface circuit 101 including a signal row and the like. The computer 100 is configured by, for example, a PC, but is not limited thereto, and may be configured by a circuit board such as an LSI board or a combination thereof. The storage unit 70 includes a storage device such as a ROM, a RAM, and a nonvolatile storage device.

A plurality of sample cups 15 are installed and held on the sample disk 10. The sample cup 15 is a sample container that stores a sample 2. The sample cups 15 are provided side by side to be held on the disk body 11 of the sample disk 10 so as to be spaced apart from each other along the circumferential direction.

The drive unit 12 of the sample disk 10 drives and controls the sample disk 10 according to the control from the analysis control unit 50 (control unit 53 in FIG. 2). In this case, the drive unit 12 rotates a disk main body 11 to move the plurality of sample cups 15 in the circumferential direction. In the sample disk 10, one sample cup 15 of the plurality of sample cups 15 installed in the disk body 11 is disposed at a predetermined position along the circumferential direction by the drive control of the drive unit 12. The predetermined position is, for example, a sample suction position by the sample dispensing mechanism 41 or the like.

In the configuration example of FIG. 1, in the sample disk 10, a plurality of sample cups 15 are disposed on the disk main body 11 in a row in a circle along the circumferential direction. The configuration is not limited thereto, and a configuration in which the sample cups 15 are disposed in a plurality of rows concentrically with the disk main body 11 may be adopted. In the configuration example of FIG. 1, the disk type sample disk 15 is provided, but is not limited thereto, and a rack system with sample disks may be used. In the rack system, a sample rack in which a plurality of sample containers are arranged and held in one or two dimensions is used.

The reagent disk 30 is installed next to the reaction disk 20. A plurality of reagent bottles 35 are installed and held on the disk main body 31 of the reagent disk 30. The reagent bottle 35 is a reagent container that contains the reagent 4. The reagent bottles 35 are provided side by side to be held so as to be spaced apart from each other along the circumferential direction of the disk main body 31. The reagent bottle 35 contains a reagent 4 of a type according to the target component substance of the test item in the automated analyzer 1. The reagents 4 are stored in separate reagent bottles 35 for each type.

The drive unit 32 of the reagent disk 30 rotates the disk main body 31 to move the plurality of reagent bottles 35 in the circumferential direction according to the control from the analysis control unit 50. In the reagent disk 30, one reagent bottle 35 to be used among a plurality of reagent bottles 35 installed in the disk main body 31 is disposed at a predetermined position of the reagent disk 30 by drive control of the drive unit 32. The predetermined position is, for example, a reagent suction position by the reagent dispensing mechanism 42 or the like.

The reagent disk 30 is provided with a reagent refrigerator 38 including a cooling mechanism. The plurality of reagent bottles 35 disposed on the disk main body 31 are cooled while being constantly held in the cooling environment of the reagent refrigerator 38 even when the disk main body 31 rotates. With this configuration, deterioration of the reagent 4 is prevented. As a cooling mechanism of the reagent refrigerator 38, for example, a method of circulating low-temperature water or a method of cooling in a gas phase by a Peltier element is used.

The reaction disk 20 is installed between the sample disk 10 and the reagent disk 30. A plurality of reaction containers 25 are installed and held on the disk body 21 of the reaction disk 20. The reaction container 25 is a container in which a reaction liquid 3 is prepared. The reaction liquid 3 is a mixture liquid of the sample 2 and the reagent 4. The sample 2 is dispensed into the reaction container 25 by the sample dispensing mechanism 41, the reagent 4 is dispensed by the reagent dispensing mechanism 42, and the reaction liquid 3 is prepared by the mixture liquid of the sample 2 and the reagent 4. The reaction containers 25 are provided side by side to be held so as to be spaced apart from each other along the circumferential direction of the disk main body 21. The reaction container 25 is made of a translucent material for measurement by the absorption photometer 44 and the scattering photometer 45. The drive unit 22 of the reaction disk 20 rotates the disk body 21 to move the plurality of reaction containers 25 along the circumferential direction according to the control from the analysis control unit 50. In the reaction disk 20, one of the plurality of reaction containers 25 is disposed at a predetermined position provided along the circumferential direction by rotating the disk main body 21. The predetermined position is, for example, a sample discharge position by the sample dispensing mechanism 41, a reagent discharge position by the reagent dispensing mechanism 42, or the like.

Each of the plurality of reaction containers 25 disposed on the disk main body 21 of the reaction disk 20 is constantly immersed in thermostatic bath water (also referred to as constant-temperature fluid) in thermostatic bath 28. With this configuration, the reaction liquid 3 in the reaction container 25 is maintained at a constant reaction temperature (for example, about 37° C.). The temperature and the flow rate of thermostatic bath water in thermostatic bath 28 are controlled by the analysis control unit 50 (constant-temperature fluid control unit 54 in FIG. 2), and the amount of heat supplied to the reaction container 25 is controlled.

On and around the circumference of the reaction disk 20, in addition to the sample dispensing mechanism 41 and the reagent dispensing mechanism 42, the positions are different from each other, and the stirring unit 43, the absorption photometer 44, the scattering photometer 45, and the cleaning unit 46 and the like are disposed at different positions.

The sample dispensing mechanism 41 is installed between the sample disk 10 and the reaction disk 20. The sample dispensing mechanism 41 performs a sample dispensing operation which is an operation of sucking the sample 2 from the sample cup 15 at the sample suction position of the sample disk 10 and discharging the sample 2 to the reaction container 25 at the sample discharge position of the reaction disk 20. The sample dispensing mechanism 41 includes a movable arm and a dispensing nozzle. The dispensing nozzle is composed of a pipette nozzle added to a movable arm. During the sample dispensing operation, the sample dispensing mechanism 41 moves the dispensing nozzle to the sample suction position on the sample disk 10 and sucks a predetermined amount of the sample 2 into the dispensing nozzle from the sample cup 15 disposed at the sample suction position and contains the sample. Thereafter, the sample dispensing mechanism 41 moves the dispensing nozzle to the sample discharge position on the reaction disk 20 and discharges the sample 2 in the dispensing nozzle into the reaction container 25 disposed at the sample discharge position.

The reagent dispensing mechanism 42 is installed between the reagent disk 30 and the reaction disk 20. The reagent dispensing mechanism 42 performs a reagent dispensing operation which is an operation of sucking the reagent 4 from the reagent bottle 35 at the reagent suction position of the reagent disk 30 and discharging the reagent 4 to the reaction container 25 at the reagent discharge position of the reaction disk 20. The reagent 4 to be dispensed is a reagent used for quantifying a target component substance, which is an analysis item (also referred to as a test item or the like) set corresponding to the target sample 2. Similarly, the reagent dispensing mechanism 42 includes a movable arm and a dispensing nozzle. During the reagent dispensing operation, the reagent dispensing mechanism 42 moves the dispensing nozzle to the reagent suction position on the reagent disk 30 and sucks a predetermined amount of reagent 4 from the reagent bottle 35 disposed at the reagent suction position into the dispensing nozzle and contains the reagent 4. Thereafter, the reagent dispensing mechanism 42 moves the dispensing nozzle to the reagent discharge position on the reaction disk 20, and discharges the reagent 4 in the dispensing nozzle into the reaction container 25 disposed at the reagent discharge position.

The sample dispensing mechanism 41 and the reagent dispensing mechanism 42 are each provided with a cleaning unit 46 in preparation for dispensing a different type of the sample 2 or the reagent 4. The cleaning unit 46 is a mechanism for cleaning the dispensing nozzle. Each dispensing mechanism cleans each dispensing nozzle in the cleaning unit 46 before and after the dispensing operation. With this configuration, contamination between the samples 2 or between the reagents 4 is prevented. The dispensing nozzle of each dispensing mechanism is provided with a sensor for detecting the liquid level of the sample 2 or the reagent 4. With this configuration, a measurement abnormality due to a shortage of the sample 2 or the reagent 4 can be monitored and detected. In addition, the sample dispensing mechanism 41 is provided with a pressure sensor for detecting clogging of the dispensing nozzle. With this configuration, a dispensing abnormality caused by an insoluble substance such as fibrin contained in the sample 2 clogging the dispensing nozzle can be monitored and detected. The analysis control unit 50 can monitor and detect various abnormalities and the like at the time of measurement through a mechanism including these sensors.

The stirring unit 43 stirs the mixture liquid of the sample 2 and the reagent 4 in the reaction container 25 disposed at a predetermined stirring position on the reaction disk 20. With this configuration, the mixture liquid in the reaction container 25 is uniformly stirred, and the reaction is promoted, and is prepared as the reaction liquid 3. The stirring unit 43 includes, for example, a stirrer provided with a stirring blade or a stirring mechanism using ultrasonic waves.

Of the two types of photometers, one is a single absorption photometer 44 as a first type photometer and the other is a single scattering photometer 45 as a second type photometer. Each photometer of the absorption photometer 44 and the scattering photometer 45 has a light source and a light receiving unit as a basic structure. The light source of each photometer is disposed, for example, on the inner circumferential side of the reaction disk 20, and the light receiving unit of each photometer is disposed on the outer circumferential side of the reaction disk 20. Each photometer is connected to the analysis control unit 50 (measurement unit 51 in FIG. 2).

The absorption photometer 44 measures the reaction liquid 3 in the reaction container 25 disposed at a predetermined measurement position (particularly, a first measurement position) on the reaction disk 20. The scattering photometer 45 measures the reaction liquid 3 in the reaction container 25 disposed at a predetermined measurement position (particularly, a second measurement position) on the reaction disk 20. In the configuration example of FIG. 1, two photometers of the absorption photometer 44 and the scattering photometer 45 are installed at predetermined positions, which face each other on a diagonal row passing through the center of rotation of the reaction disk 20, on the circumference of the reaction disk 20. The absorption photometer 44 is disposed for the first measurement position and the scattering photometer 45 is disposed for the second measurement position. On the circumference, the stirring unit 43 and the cleaning unit 46 are disposed at a predetermined position between the first measurement position and the second measurement position.

The absorption photometer 44 irradiates the reaction liquid 3 in the reaction container 25 at the first measurement position with light from the light source. At this time, the absorption photometer 44 detects transmitted light obtained from the reaction liquid 3 by the light receiving unit and measures at least one (may be referred to as light amount/light intensity) of the light amount and the light intensity of the transmitted light having a single or a plurality of wavelengths. The absorption photometer 44 may obtain a quantitative value such as a concentration by a predetermined calculation based on the measured value. The absorption photometer 44 outputs a signal including a measured value or a calculated value.

The scattering photometer 45 irradiates the reaction liquid 3 in the reaction container 25 at the second measurement position with light from a light source. At that time, the scattering photometer 45 detects the scattered light obtained from the reaction liquid 3 by the light receiving unit, and measures at least one of the amount of scattered light and the light intensity (light amount/light intensity). The scattering photometer 45 may obtain a quantitative value such as a concentration by a predetermined calculation based on the measured value. The scattering photometer 45 outputs a signal including a measured value or a calculated value.

The cleaning unit 46 performs cleaning for the reaction container 25 disposed at the cleaning position on the reaction disk 20. The cleaning unit 46 discharges the remaining reaction liquid 3 from the reaction container 25 for which the measurement and the analysis have been ended, and cleans the reaction container 25. The cleaned reaction container 25 can be reused. That is, the next sample 2 is again dispensed from the sample dispensing mechanism 41 into the reaction container 25, and the next reagent 4 is dispensed from the reagent dispensing mechanism 42.

[Analysis Control Unit]

FIG. 2 mainly illustrates a functional block configuration of the analysis control unit 50 in the configuration of FIG. 1. The analysis control unit 50 controls the entire automated analyzer 1 and the automated analysis sequence, and controls analysis including measurement. The analysis control unit 50 is connected to the interface circuit 101, the output unit 71, the input unit 72, and the like. The analysis control unit 50 performs output (that is, screen display, audio output, and the like) to the output unit 71. The analysis control unit 50 receives an input (that is, an operation by a user or the like) from the input unit 72. The user of the automated analyzer 1 performs work and operations relating to the clinical test via the output unit 71 and the input unit 72. The output unit 71 includes an output device such as a display device. Information such as measurement results and data alarms is displayed on the display screen of the display device under the output control of the analysis control unit 50. The output unit 71 may include a sound output device, and may emit an alarm sound. The input unit 72 includes an input device such as a keyboard, a mouse, or an operation panel including operation buttons.

The computer 100 and the analysis control unit 50 can be integrally realized by a PC as an implementation example, but can be implemented without being limited thereto. The analysis control unit 50 executes processing according to a program read from the storage unit 70 by a microprocessor such as a CPU of a PC, for example. With this configuration, each unit such as the measurement unit 51 is realized. The analysis control unit 50 includes, as functional blocks realized by software program processing or the like, the measurement unit 51, an interpretation unit 52, a control unit 53, a constant-temperature fluid control unit 54, a data storage unit 55, a simultaneous analysis determination unit 56, and automatic retesting determination unit 57, an abnormality-during-measurement check unit 58, a priority output determination unit 59, and a priority output alarm determination unit 60. The analysis control unit 50 controls various functions including a simultaneous analysis function, a measurement result selection function, a data alarm function, an output control function, and automatic retesting function, which will be described later. The analysis control unit 50 mainly performs operation control processing of each mechanism and a part of the automated analyzer 1, measurement data control processing, and the like as analysis processing for the sample 2 for which the analysis requested by the measurement unit 51, the interpretation unit 52, and the control unit 53.

The data storage unit 55 is configured using the storage unit 70, and performs reading and writing of various data. The data storage unit 55 stores various data related to analysis, including measurement results, data alarms, and automatic retesting information.

The measurement unit 51 performs measurement processing by receiving signals including measurement values of the absorption photometer 44 and the scattering photometer 45, which are two types of photometers. This measurement processing includes a predetermined calculation. This calculation includes, for example, calculating the concentration of the target component substance based on the measured light amount/light intensity, or calculating the light intensity from the light amount which is the measured value. The measurement unit 51 stores the measurement result (measured value or calculated value) in the data storage unit 55 as measurement data.

The interpretation unit 52 refers to the measurement data of the measurement result in the data storage unit 55 and performs interpretation processing corresponding to automated analysis. This interpretation processing is, for example, to calculate the concentration from the light intensity of the measurement data using a calibration curve. Alternatively, this interpretation processing is to calculate the component amount of the target component substance using the calculated concentration. In addition, the interpretation unit 52 judges the presence or absence of an abnormality or the like at the time of measurement for each measurement result of each type of photometer, and when there is an abnormality or the like, a data alarm indicating the abnormality or the like is added to the measurement result. The judgment by the interpretation unit 52 is an independent judgment for each type of photometer. The interpretation unit 52 makes a judgment with reference to control result information and the like stored in the data storage unit 55 by the control unit 53 when judging an abnormality or the like at the time of measurement.

The control unit 53 is a drive control unit that performs drive control of each mechanism according to the automated analysis sequence. The control unit 53 performs drive control based on analysis request information of the target sample 2 stored in the data storage unit 55 and the like. The control unit 53 controls various parts including the drive unit 12, the drive unit 22, the drive unit 32, the sample dispensing mechanism 41, the reagent dispensing mechanism 42, the absorption photometer 44, and the scattering photometer 45. For example, the drive unit 12 drives and rotates the sample disk 10 according to the control from the control unit 53. For example, the control unit 53 controls driving of the sample dispensing mechanism 41 to perform a sample dispensing operation. For example, the control unit 53 controls driving of the absorption photometer 44 to perform measurement at each measurement point-in-time in a predetermined period. The control unit 53 controls the operation of each part at the time of analysis, and stores control result information indicating the control state and the result in the data storage unit 55. When there is an abnormality or the like in the mechanism or when an abnormality or the like is detected in the mechanism, the control result information includes information indicating the abnormality or the like.

The control unit 53 rotates each disk such as the sample disk 10 and disposes a container such as the target sample cup 15 at a predetermined position of each disk. Due to the rotation of the disk, each container repeats a rotational movement of a unit distance on the circumference and a stationary state. The control unit 53 prepares the plurality of reaction liquids 3 of samples 2 in the plurality of reaction containers 25 on the reaction disk 20 by controlling the operation of each disk, the sample dispensing mechanism 41, and the like. Then, in the case of simultaneous analysis, the control unit 53 measures the light amount/light intensity of the reaction liquid 3 of the target reaction container 25 disposed at each measurement position on the reaction disk 20 by controlling two types of photometers.

The constant-temperature fluid control unit 54 controls the temperature and flow rate of thermostatic bath water in thermostatic bath 28 of the reaction disk 20 to adjust the temperature of the reaction liquid 3 in the reaction container 25.

The simultaneous analysis determination unit 56 makes a determination for output control based on the measurement results of the two types of photometers and the data alarms in the case of simultaneous analysis. The automatic retesting determination unit 57 is, in other words, an abnormality determination unit, and determines whether or not the automatic retesting is necessary based on the abnormality or the like at the time of measurement regarding the measurement result using one type of photometer. The abnormality-during-measurement check unit 58 determines and checks whether or not an abnormality or the like represented by a data alarm has occurred in the measurement results of the two types of photometers. The priority output determination unit 59 determines a measurement result to be output with priority based on a predetermined judgment or judgment of priority output setting for the measurement results of the two types of photometers. The priority output alarm determination unit 60 determines a data alarm or the like to be output with priority among two types of data alarms added to the two types of measurement results.

[Characteristics of Photometer]

FIG. 3 illustrates the characteristics of the absorption photometer 44 and the scattering photometer 45, which are two types of photometers used in Embodiment 1. As illustrated in FIG. 3, the two types of photometers have different quantitative range characteristics. In the graph of FIG. 3, the horizontal axis represents a theoretical value (unit [U/mL])

and the vertical axis represents a measured value (unit [U/mL]) of each photometer for the concentration of the target component substance of the target sample. The region indicated by the broken row indicates a quantitative range of the absorption photometer 44, which is the first type photometer. The region indicated by the one-dot chain row indicates a quantitative range of the scattering photometer 45, which is the second type photometer. A range 301 indicates a normal output range in the quantitative range of the absorption photometer 44. In other words, the normal output range indicates a range in which measurement and quantification can be suitably performed. A range 302 indicates a normal output range in the quantitative range of the scattering photometer 45. A range 303 indicates an overlapping range between the two types of ranges 301 and 302. The range 303 is a range in which measurement results of basically any type of photometer may be used. In the analysis control unit 50, a suitable quantitative range for each photometer is set in advance for output control. That is, ranges (at least an upper limit value, a lower limit value, and the like defining the range) corresponding to the range 301, the range 302, the range 303, and the like is set.

The range 301 of the absorption photometer 44 generally has a shape having a narrow width (the range of the measured value with respect to theoretical value) around a reference straight row 300, and has linear characteristics. In a range where the value is smaller than the range 301, the shape has a width wider than the reference straight row 300, and has characteristics with a large error. The range 302 of the scattering photometer 45 generally has a shape having a narrow width around the reference straight row 300, and has linear characteristics. In a range where the value is larger than the range 302, the shape has a width that spreads in a region below the reference straight row 300, and has characteristics with a large error.

When two types of measurement results are obtained by the simultaneous analysis, the analysis control unit 50 selects a measurement result to be output based on the judgment of the characteristics (corresponding range) as described below. This judgment is included in the rules of a correspondence table described later. Regarding the concentration of the target component substance, in a relatively high concentration range (for example, a range of about 10 U/mL or more), as illustrated in the range 301, quantification of the absorption photometer 44 is more accurate and suitable. For that reason, the measurement result of the absorption photometer 44 is selected as the output. Conversely, in the range of relatively low concentration (for example, a range of about 5 U/mL or less), as illustrated by the range 302, quantification of the scattering photometer 45 is more accurate and preferable. For that reason, the measurement result of the scattering photometer 45 is selected as the output.

Furthermore, in a relatively medium concentration range (for example, a range of about 5 U/mL or more and about 10 U/mL or less) corresponding to the range 303, any of the two types of measurement results can be basically used. In the case of this range, the measurement result of any one type of photometer is selected as the output according to, for example, the priority output setting described later. Each test item has a priority output setting.

[Priority Output Setting]

The priority output setting is a setting as to which of the two types of photometers of the absorption photometer 44 and the scattering photometer 45 is used and outputs the measurement result and the data alarm with priority. The automated analyzer 1 has a priority output setting function, and a priority output setting is set as a default setting for implementing by a business operator in advance, and corresponding priority output setting information is stored. As priority output setting information, which type of photometer is to be prioritized is set by a value of a predetermined format such as a priority ranking. The priority output setting information can be set, for example, through the input unit 72 in advance. In the automated analyzer 1, an ON state or an OFF state of the priority output setting function is also set, and the state can also be variably set by a business operator or a user. When the priority output setting function is to be invalidated, the function is set to the OFF state. As described later, in the case of the ON state, a priority output determination is performed based on the priority output setting information, and not performed in the case of the OFF state.

[Simultaneous Absorption•Scattering Analysis Function]

The automated analyzer 1 has a simultaneous analysis function which is a function of simultaneously measuring and analyzing the target sample 2 using two types of photometers, based on the characteristics of the two types of photometers described above. When a simultaneous analysis request for the target component substance of the sample 2 is received, the automated analyzer 1 performs simultaneous absorption and scattering analysis. In this function, the measurement by the absorption photometer 44 and the measurement by the scattering photometer 45 are performed on the target component substance of the same one test item of the same target one sample 2 to obtain two types of measurement results. At this time, the automated analyzer 1 measures a reaction process of the reaction liquid 3 in the reaction container 25 of the target sample 2 substantially simultaneously using two types of photometers. Since each measurement is performed at two types of measurement positions on the reaction disk 20, there is a predetermined time difference. The reaction process is a continuous measurement process including a plurality of measurements at predetermined point-in-times on the time axis at a predetermined time during which the reaction container 25 stops at the measurement position of the photometry.

The automated analyzer 1 selects a suitable measurement result from the two types of measurement results in the simultaneous analysis, based on the characteristics described above. When the automated analyzer 1 falls within a relatively high concentration range (for example, a range excluding the range 303 from the range 301), the automated analyzer 1 selects the measurement result for the absorption photometer 44 and performs an absorption analysis. When the automated analyzer 1 falls within a relatively low concentration range (for example, a range obtained by excluding the range 303 from the range 302), the automated analyzer 1 selects a measurement result of the scattering photometer 45 and performs a scattered light analysis. With this configuration, measurement and analysis can be performed with high accuracy in a wide concentration range including high concentration and low concentration.

[Automatic Retesting Function]

The automated analyzer 1 has automatic retesting function, which is a function of controlling to perform a retesting automatically according to a predetermined judgment when an abnormality or the like is detected at the time of measurement. In Embodiment 1, the automatic retesting function is a function controlled in relation to the data alarm function and the output control function. The output control function includes a function of selecting automatic retesting information for the automatic retesting function.

In the case of an abnormality or the like at the time of measurement, for example, a minor abnormality such as an abnormality in sample concentration, it is speculated that an appropriate result is highly likely to be obtained by performing remeasurement after taking measures such as diluting the sample 2 or reducing or increasing the sample amount. For that reason, when an abnormality or the like at the time of measurement is detected, the automated analyzer 1 selects the necessity of the automatic retesting, the remeasurement condition when the automatic retesting is necessary, and the like as part of the automatic retesting information of the output according to the combination of the corresponding data alarms. Then, the automated analyzer 1 automatically controls the remeasurement according to the automatic retesting information and outputs the result of the retesting by the automatic retesting function.

When performing the automatic retesting, the automated analyzer 1 collects a new sample 2 from the sample cup 15 in which the target sample 2 is stored according to automatic retesting request information and automatic retesting information, and performs reprocessing including dispensing for storing the sample 2 in the reaction container 25 and the like. The automated analyzer 1 performs remeasurement on the reaction container 25 using a selected type of photometer. When a data alarm is further added to the result of the automatic retesting, the output selection according to the combination of the data alarms may be similarly applied, or may not be applied.

[Data Alarm Function]

The automated analyzer 1 has a data alarm function which is a function of adding a data alarm indicating a detected abnormality or the like to the measurement result of the photometer. Even in the case of simultaneous analysis, the automated analyzer 1 adds each data alarm to each measurement result of the two types of photometers according to detection of an abnormality or the like. In particular, when there is an abnormality or the like during the measurement of the absorption photometer 44, the interpretation unit 52 adds a first data alarm indicating the abnormality or the like to the first measurement result of the absorption photometer 44. Further, when there is an abnormality or the like during measurement of the scattering photometer 45, the interpretation unit 52 adds a second data alarm indicating the abnormality or the like to the second measurement result of the scattering photometer 45. The interpretation data including the measurement result to which the data alarm is added is stored in the data storage unit 55.

[Output Control Function]

If there is an abnormality or the like during measurement described above, a data alarm may be added to all (both) measurement results of a plurality (two types) of photometers. In this case, the automated analyzer 1 has an output control function which is a function of selecting a measurement result and a data alarm to be output according to a combination of data alarms. The output control function includes a function of controlling the automatic retesting function and a function of selecting automatic retesting information to be output.

[Example of Abnormality or the Like at the Time of Measurement]

Examples of abnormalities and errors that can occur in the automated analyzer include the following. Examples of the abnormality of the mechanism include a shortage of the sample amount, a shortage of the reagent amount, a dispensing error due to clogging in a channel with fibrin included in the sample 2, an abnormality of a component of the sample 2, and the like. An example of the abnormality of the component of the sample 2 includes a case where the concentration of the sample 2 is out of the quantitative range of the photometer as a sample concentration abnormality. That is, cases where the concentration of the sample 2 is too high or too low as compared with the quantitative range of the photometer are included. A case where the red color of the sample 2 changes due to elution of the blood cell component, a case where turbidity of the sample 2 observed in a patient with dyslipidemia occurs, and the like, are included.

[Data Alarm]

FIG. 4 illustrates, in a table format, definitions of classifications of a plurality of types of data alarms that can be output according to a possible abnormality or error in the automated analyzer 1. Hereinafter, first, various abnormalities and data alarms will be described. Generally, in an automated analyzer, there are roughly the following two means, as technical means for alerting a user based on an abnormality or an error occurring during measurement and analysis.

The first means is a technique of adding a data alarm to a measurement result and outputting the result. In this technique, for each measurement result of the target component substance of the test item that exists more than one for each sample, identification information indicating whether it is normal or abnormal, and in the case of an abnormality, predetermined information indicating the type of the abnormality or the like is added as a data alarm. Information represented the type of abnormality or the like includes, for example, an identification code, a mark, a description, and the like.

When information of the measurement result with the data alarm is output from the automated analyzer, the user can recognize the type of the abnormality or the like that has occurred by checking the information on the display screen. Then, the user performs coping work or the like according to the abnormality or the like represented by the data alarm. For example, the user performs the coping work according to the identification code of the data alarm, the operation manual (a guide may be used on a display screen instead of paper) of the automated analyzer. The coping work is work or operation for making a retesting possible by improving the state of the automated analyzer, such as an abnormality, to return to a normal state.

The second means is a technique of outputting a system alarm. In this technique, an alarm (for example, audio output) issued to the user as an abnormality relating to the entirety of the automated analyzer, such as a temperature abnormality or a mechanism abnormality, as a system alarm. The system alarm can also be displayed on the screen as a data alarm to which system alarm identification information is added, as one of the data alarms.

The automated analyzer 1 of Embodiment 1 has at least a data alarm function corresponding to the first means. As illustrated in FIG. 4, the automated analyzer 1 has a plurality of types of data alarms defined in advance according to types of abnormalities and the like. In Embodiment 1, a plurality of types of data alarms are roughly classified into three groups and levels as described below. In the table of FIG. 4, (A) is a high level and first group data alarm, (B) is a middle level and second group data alarm, and (C) is a low level and third group data alarm. High, middle, and low are relative terms.

(A) First group and high level: The first group and high level corresponds to a case where the retesting is necessary to obtain accurate measurement results because there is an abnormality and the like, but for that reason, the retesting cannot be performed until the state is improved by the user. Improvement of the state includes improvement of the sample 2 and the reagent 4, that is, improvement of the reaction liquid 3 in the reaction container 25, and improvement of the state of a mechanism such as a dispensing mechanism and a cleaning mechanism. Improvement of the state includes, for example, changing the state of the sample 2 to a reduced state when the sample amount of the reaction liquid 3 in the reaction container 25 is large, or changing the state of the sample 2 to an increased state when the sample amount is small. In such a case, the automated analyzer 1 outputs a high level data alarm as output control, does not immediately perform automatic retesting, and prompts the user to perform coping work or operation including improvement of the state. The automated analyzer 1 causes automatic retesting to be performed after the state is improved.

(B) Second group and middle level: The second group and middle level corresponds to a case where the retesting is necessary because there is an abnormality and the like, but for that reason, the retesting is possible without requiring user's operation. This case corresponds to a case where it can be speculated that a good measurement result can be obtained by a retesting under the controlled remeasurement condition. In this case, the automated analyzer 1 sets, for example, the reagent amount in the reaction liquid 3 to the same condition as that at the time of the previous measurement (that is, when an abnormality or the like is detected at the time of measurement), or to the condition for increasing or decreasing the reagent amount, as the remeasurement condition. In such a case, the automated analyzer 1 outputs the data alarm of middle level and performs remeasurement under the remeasurement condition, thereby making an attempt to acquire a good measurement result.

(C) Third group and low level: The third group and low level corresponds to a case where remeasurement is not required in the obtained measurement result, and the measurement result is treated as a reference value and can be output. In this case, the automated analyzer 1 outputs a data alarm of low level.

The data alarms of respective groups and levels described above are further defined as including various data alarms as follows. Each data alarm is given an identification code and the like for explanation and implementation. Examples of the identification code are indicated by "A1", "B1", and the like.

(A) The first group and the high level data alarm include, for example, the following five data alarms. FIG. 4A indicates a corresponding table portion. In each row of the table, "A1" and the like in parentheses indicate a data alarm identification code. In this example, a sample shortage alarm A1, a reagent shortage alarm A2, a clogging detection alarm A3, a detergent shortage alarm A4, and a photometer abnormality alarm A5 are included.

(1) The sample shortage alarm A1 is a data alarm that occurs when the liquid level detection sensor or the like provided in the sample dispensing mechanism 41 determines that the amount of sample 2 of the reaction liquid 3 in the sample cup 15 or the reaction container 25 is insufficient.

(2) The reagent shortage alarm A2 is a data alarm that occurs when the liquid level detection sensor or the like provided in the reagent dispensing mechanism 42 determines that the amount of the reagent 4 of the reaction liquid 3 in the reagent bottle 35 or the reaction container 25 is insufficient.

(3) The clogging detection alarm A3 is a data alarm that occurs when a pressure sensor or the like provided in the sample dispensing mechanism 41 determines that a clogging has occurred in the channel, such as, when a foreign substance is mixed into the dispensing nozzle in suction of the sample 2.

(4) Detergent shortage alarm A4 is a data alarm that occurs due to a shortage of detergent used for cleaning the dispensing nozzle and the reaction container 25 in the cleaning unit 46.

(5) The photometer abnormality alarm A5 is a data alarm that occurs when an abnormality is detected in an optical system, a substrate, and the like (the light source and the light receiving unit described above) in the absorption photometer 44 and the scattering photometer 45.

(B) The data alarms of the second group and the middle level are roughly classified into (B-1) a data alarm derived from a reaction process abnormality and (B-2) a data alarm derived from a sample concentration abnormality. For example, the (B-1) and the (B-2) include the following data alarms, respectively. FIG. 4B indicates the corresponding table portion.

(B-1) Examples of the data alarms derived from the reaction process abnormality include a cell blank abnormality alarm. B1, an absorbance difference abnormality alarm B2, a scattered light intensity difference abnormality alarm B3, and a calculation impossible alarm.

(1) The cell blank abnormality alarm. B1 is a data alarm that occurs when the cell blank value measured before the analysis of the target component substance of the sample 2 deviates from the cell blank value stored in advance in the automated analyzer 1 or when it deviates from the cell blank value of another reaction vessel to be compared. The cell blank value is an optical measurement value in a state in which the reaction liquid 3 is not contained in the reaction container 25.

(2) Absorbance difference abnormality alarm B2 is a data alarm that occurs when an absorbance difference or an absorbance change rate between specific measurement point-in-times in the reaction process of the target component substance measured by the absorption photometer 44 is less than a predetermined threshold value set in advance or when it exceeds the predetermined threshold value set in advance.

(3) The scattered light intensity difference abnormality alarm B3 is a data alarm that occurs when a scattered light intensity difference or scattered light intensity change rate between specific measurement point-in-times in the reaction process of the target component substance measured by the scattered light meter 45 is less than a predetermined threshold value set in advance or when it exceeds the predetermined threshold value set in advance.

Data alarms derived from these reaction process abnormalities corresponds to a case where automatic retesting can be performed without state improvement work by the user since it is unlikely that there is an abnormality in the mechanism, the sample 2, the reagent 4, and the like of the automated analyzer 1. For that reason, in this case, the automated analyzer 1 causes the automatic analysis to be performed again under the same condition as that at the time of the previous measurement as the remeasurement condition, in order to obtain accurate measurement results, as output control.

(B-2) Examples of alarms derived from a specimen concentration abnormality include a prozone alarm B4, a quantitative range upper limit over alarm B5, an absorbance/scattered light intensity over alarm, a quantitative range lower limit over alarm B6, a repeat upper limit alarm, and a repeat lower limit alarm.

(1) The prozone alarm B4 is a data alarm that occurs when the amount of antigen or antibody in the sample 2 in immunoassay is excessive. As a determination method relating to this, there are a known reaction rate ratio method, an antigen/antibody re-addition method, and the like. In the reaction rate ratio method, the ratio between the amount of change in absorbance (or amount of change in scattered light intensity) per unit time at the beginning of the reaction and the amount of change in absorbance (or amount of change in scattered light intensity) at the end of the reaction is calculated from the reaction process of the target component substance of the test item and compared with a preset threshold value. In the antigen/antibody re-addition method, an additional antigen or antibody is added after the reaction is ended, and the amount of change in absorbance or the amount of change in scattered light intensity per unit time immediately after the addition is calculated and compared with a preset threshold.

(2) Quantitative range upper limit over alarm B5 is one of the technical limit over, and is a data alarm that occurs when the upper limit of the suitable quantitative range for each pre-set photometer type is exceeded. For example, this data alarm occurs when the concentration of the sample 2 in the reaction liquid 3 is too high for the quantitative range of the photometer. For example, in FIG. 3 described above, when the concentration of the sample 2 exceeds the upper limit of the normal output range 301 in the case of the measurement by the absorption photometer 44, this data alarm occurs.

Quantitative range lower limit alarm B6 is one of the technical limit over, and is a data alarm that occurs when the lower limit of the suitable quantitative range for each pre-set photometer type is exceeded. For example, this data alarm occurs when the concentration of the sample 2 in the reaction liquid 3 is too low for the quantitative range of the photometer. For example, in FIG. 3 described above, when the concentration of the sample 2 falls below the lower limit of the normal output range 301 in the case of the measurement by the absorption photometer 44, this data alarm occurs.

Normally, the sample 2 in which the abnormality corresponding to the prozone alarm B4 has occurred contains an excessive amount of the target component substance and has a high concentration, and thus the quantitative range upper limit over alarm B5 also occurs at the same time. The prozone alarm B4 occurs when the target component substance is excessive as compared with the case of the quantitative range upper limit over alarm B5. For that reason, when these two data alarms occur simultaneously, the automated analyzer 1 selects and outputs only the prozone alarm B4 as output control. These data alarms correspond to the case where automatic retesting is possible because there is no abnormality in the mechanism, the sample 2, the reagent 4, and the like of the automated analyzer 1.

When the prozone alarm B4 or the quantitative range upper limit over alarm B5 occurs, it indicates that the concentration of the target component substance in the sample 2 is too high. For that reason, in this case, the automated analyzer 1 causes automatic retesting to be performed in a state in which the sample amount in the reaction liquid 3 is reduced (or a state in which the sample 2 is diluted with the reagent 4) as a remeasurement condition. Further, when the quantitative range lower limit over alarm B6 occurs, it indicates that the concentration of the target component substance in the sample 2 is too low. For that reason, in this case, the automated analyzer 1 is caused to perform automatic retesting in a state in which the sample amount of the reaction liquid 3 is increased as a remeasurement condition.

(C) The third group and the low level data alarm include, for example, the following two data alarms. FIG. 4C indicates a corresponding table portion. In this example, a serum information alarm C1, a reagent expiration alarm C2, and a sample carryover are included.

(1) The serum information alarm C1 is a data alarm that occurs when a coexisting substance that affects the analysis of the target component substance is mixed in the sample 2 such as blood. The coexisting substances include lipid, hemoglobin, bilirubin and the like. The samples 2 (also referred to as an abnormal sample) in which these coexisting substances are mixed are called milky fluid, hemolysis, and yellow, respectively. Hemolysis (also referred to as red change) and yellow have a large influence mainly on the absorption photometer 44 because they cause a color change of the sample 2. Milky fluid has a large influence mainly on the scattering photometer 45 because it causes a turbidity change of the sample 2. The serum information is information on the coexisting substance as described above. The serum information is usually determined by measuring the absorbance of sample 2 itself using the reagent 4 that does not react with the sample 2 and using light of a wavelength corresponding to each coexisting substance, separately from the analysis of the target component substance of the test item. Each measured absorbance is compared with a preset threshold value, and the serum information alarm C1 is added to the absorbance exceeding the threshold value.

(2) The reagent expiration alarm C2 is a data alarm that occurs when the reagent 4 registered in the automated analyzer 1 has expired.

When these data alarms of low level are output, the measurement itself has ended normally and the measurement result has been obtained. For that reason, the automated analyzer 1 treats the measurement result as a reference value and outputs the measurement result, as output control. In this case, the state does not improve unless the sample 2 or the reagent 4 is replaced. For that reason, the automated analyzer 1 does not require the automatic retesting and does not perform the automatic retesting.

In the output control function of the automated analyzer 1, for each measurement of the two types of photometers, basically one selected data alarm is added to the measurement result, based on the detection of an abnormality or the like, the definition of the data alarm, and the predetermined judgment by the analysis control unit 50 (in particular, interpretation unit 52). Information in which a data alarm is added to the measurement result is temporarily stored in the data storage unit 55. Each unit such as the simultaneous analysis determination unit 56 performs output control with reference to the information in the data storage unit 55.

Depending on the type of abnormality or the like, a plurality of data alarms may be candidates for addition for the measurement result of one type of photometer. In this case, in the automated analyzer 1, one data alarm is selected and added based on a previous setting or a predetermined judgment. This setting is a design item of the data alarm function. For example, as a definition of a data alarm, importance and priority ranking are set in advance between a plurality of types of data alarms (corresponding abnormalities, and the like). Although not illustrated in FIG. 4, a priority ranking number is set for each data alarm, for example. The interpretation unit 52 selects a data alarm having the highest priority ranking among a plurality of candidate data alarms. An automated analyzer according to a modification example does not have the priority ranking setting described above, and a plurality of data alarms may be added to one measurement result.

In the above description, although the three levels of data alarms and corresponding abnormalities and the like have been described with reference to some specific examples, the present invention is not limited to these specific examples, and is similarly applicable to other types of abnormalities and the like and data alarms. In the table of FIG. 4, examples of other types of data alarms without identification codes are also described, and are not used for output control in the embodiment, but can be similarly used in other embodiments.

[Analysis Processing (1)]

Next, output control processing according to a combination of data alarms related to the output control function of the automated analyzer 1 will be described. First, as a first stage, analysis processing performed by the measurement unit 51, the interpretation unit 52, and the control unit 53 of the analysis control unit 50 in FIG. 2 will be described. The analysis control unit 50 performs analysis processing on the target sample 2 for an analysis request is received. At this time, the control unit 53 determines whether or not a simultaneous analysis request is set as the analysis request. When the simultaneous analysis request is set, the control unit 53 causes the measurement unit 51 and the interpretation unit 52 to perform each analysis processing (absorption analysis and scattered light analysis) of the target sample 2 based on each measurement value (signal described above) obtained from the two types of photometers. When a simultaneous analysis request is not set and an analysis request for analysis ("absorption analysis" or "scattered light analysis" as "single analysis") by one of the two types of photometers is set, the control unit 53 causes the measurement unit 51 and the interpretation unit 52 to perform analysis processing on the target sample 2 based on the measurement value of the corresponding one of the photometers.

The measurement unit 51 measures the light amount/light intensity for the target sample 2 based on the measured value or the calculated value included in the signal from the photometer for each type of photometer. The measurement unit 51 obtains, based on the measured value from the absorption photometer 44, the light amount/light intensity of the transmitted light by the reaction liquid 3 in the reaction container 25 from which the measured value is obtained. The measurement unit 51 obtains, based on the measurement value from the scattering photometer 45, the light amount/light intensity of the scattered light by the reaction liquid 3 in the reaction container 25 from which the measurement value has been obtained. For example, the measurement unit 51 calculates the light intensity based on the amount of transmitted light or scattered light that is a measured value. Then, the measurement unit 51 stores information of the light intensity as measurement data, which is correlated with the information on a target reaction container 25 into which the target sample 2 is dispensed or the analysis request information on the sample 2, in the data storage unit 55. The measurement unit 51 may measure or calculate other parameters without being limited to the light intensity. The measurement data includes information (that is, the measurement value at each measurement point-in-time, and the like) on the reaction process measured by the photometer. The analysis request information includes information such as the target sample 2 and the reagent 4.

The interpretation unit 52 refers to the information of the measurement data obtained by the measurement unit 51, interprets the target component substance of the sample 2 in the target reaction liquid 3, and obtains at least one of the concentration or the component amount ("concentration/component amount") of the target component substance. The interpretation unit 52 reads out the light amount/light intensity of transmitted light or the light amount/light intensity of scattered light in the measurement data, and obtains the concentration of the target component substance. For example, the interpretation unit 52 refers to the light intensity and refers to information of the calibration curve, and calculates the concentration of the target component substance from the light intensity. At this time, the interpretation unit 52 converts the light intensity into the concentration using a calibration curve, which is created in advance and corresponds to the reagent 4 used for the reaction liquid 3. When the absorption photometer 44 is used, the interpretation unit 52 converts the transmitted light intensity into the concentration of the target component substance using the calibration curve for the absorption photometer 44. When the scattering photometer 45 is used, the interpretation unit 52 converts the scattered light intensity into the concentration of the target component substance using a calibration curve for the scattering photometer 45.

The calibration curve represents the relationship between the concentration of each target component substance obtained using a sample such as a standard substance containing a known concentration of the target component substance, and the light amount/light intensity of transmitted light or scattered light. In the data storage unit 55, calibration curve data of the reagent 4 of each reagent bottle 35 of the reagent disk 30 is stored in advance.

Then, the interpretation unit 52 stores the information on the concentration obtained by the interpretation in the data storage unit 55 as interpretation data correlated with the information on the reaction container 25 of the target sample 2 or the analysis request. In the embodiment, the concentration of the target component substance is mainly treated as the measurement result. The measurement result can be paraphrased as an analysis result, an interpretation result, or the like.

Further, the interpretation unit 52, during the interpretation described above, determines whether or not an abnormality, an error, or the like has occurred when measuring the target sample 2, based on the reaction process measured by each photometer, the interpreted concentration, and analysis parameter information, and the like set in advance. Examples of such abnormalities are as described above. When it is determined that an abnormality or the like at the time of measurement has occurred, the interpretation unit 52 adds a data alarm corresponding to the type of the abnormality or the like to the measurement result including the concentration corresponding to the type of the photometer, and stores the measurement result and the data alarm in the data storage unit 55 as interpretation data. When adding the data alarm, the interpretation unit 52 adds the data alarm selected according to the classification definition and the predetermined determination as illustrated in FIG. 4.

The control unit 53 controls the parts such as the sample disk 10, the sample dispensing mechanism 41, and each mechanism including each photometer during the analysis work of the target sample 2, and monitors and determines the occurrence of abnormalities and errors in those parts. When the control unit 52 detects a mechanism abnormality or the like, control result information including information representing the abnormality or the like is stored in the data storage unit 55. The interpretation unit 52 refers to the control result information in addition to the measurement data from the data storage unit 55. The interpretation unit 52 determines the presence or absence of an abnormality or the like at the time of measurement and the type of the abnormality, based on the measurement data and the control result information.

As described above, as the first stage, data including the measurement result is stored in the data storage unit 55 as the analysis result by the measurement unit 51, the interpretation unit 52, and the control unit 53. When there is an abnormality or the like at the time of measurement, data in which a data alarm is added to the measurement result is obtained. In the case of simultaneous analysis, each data is obtained for each type of photometer. Then, as a second stage, the analysis control unit 50 performs output control processing of an analysis result on the target sample 2 as follows. The analysis control unit 50 performs processing of the second stage by the simultaneous analysis determination unit 56, the automatic retesting determination unit 57, the abnormality-during-measurement check unit 58, the priority output determination unit 59, the priority output error determination unit 60, and the like. The analysis control unit 50 outputs the analysis result to a display screen of the output unit 71 by using the units.

[Analysis Processing (2)]

Next, the output control processing in the second stage will be described with reference to FIG. 2. In the case of simultaneous analysis, the analysis control unit 50 outputs interpretation data including the measurement results of the two types of photometers to the simultaneous analysis determination unit 56 via the data storage unit 55. The simultaneous analysis determination unit 56 refers to the interpretation data from the data storage unit 55. The analysis control unit 50 causes the automatic retesting determination unit 57, the abnormality-during-measurement check unit 58, the priority output determination unit 59, the priority output error determination unit 60, and the like to perform processing as necessary.

When outputting the result of the simultaneous analysis to the user on the display screen of the output unit 71, the analysis control unit 50 selects one suitable measurement result from the two types of measurement results based on the characteristics described above according to the level of the concentration of the target component substance or the like by the simultaneous analysis determination unit 56. Furthermore, when one or more data alarms are added to the two types of measurement results, the analysis control unit 50 performs output control processing for selecting the measurement results, the data alarm, and automatic retesting information to be output according to a combination of the data alarms as described below.

[Correspondence Table]

FIGS. 5 to 8 illustrate correspondence tables in which the correlation between a combination of a plurality of data alarms and an output used for output control in the automated analyzer 1 is defined. In particular, a correspondence table for the middle level data alarm described above is illustrated. The analysis control unit 50 and the output control function perform output control processing according to the rules of such a correspondence table. In Embodiment 1, this output control processing is implemented as software program processing as in a processing flow described later. This correspondence table may be held as an implemented table or the like (that is, determination or the like may be performed with reference to the table), or may be omitted by being implemented as a processing flow.

FIG. 5 illustrates, as a first part of the correspondence table, a first example of the correlation between the combination of the middle level data alarms described above and the output. FIG. 5A particularly illustrates a combination of data alarms derived from (B-1) reaction process abnormality. The first column "absorption" in the correspondence table indicates a first data alarm relating to the first measurement result using the absorption photometer 44. The second column "scattering" indicates a second data alarm relating to the second measurement using the scattering photometer 45. That is, a set of the first column and the second column indicates a combination of two types of data alarms. The third column "output" of the correspondence table indicates a selection, especially relating to the measurement result as the output content selected when it is the set of the first column and the second column. The fourth column "retesting" in the correspondence table indicates the necessity (presence or absence) of the automatic retesting by the automatic retesting function, which is one of the selected items. The fifth column "condition" of the correspondence table indicates automatic retesting condition (that is, a remeasurement condition or the like) when automatic retesting request is performed, which is one of the selected items.

In FIG. 5A, as the values of the first column "absorbance" and second column "scattering", 1. "absorbance difference abnormality" (B2)/"scattered light intensity difference abnormality" (B3), 2. "cell blank abnormality" (B1), and 3. "calculation impossible" are included according to FIG. 4. As a combination of these three types of values, there is a combination of 3×3=9. Here, the absorbance difference abnormality alarm B2 and the scattered light intensity difference abnormality alarm B3 are combined into one, but a combination thereof may be considered. The values of the third column "output", the fourth column "retesting", and the fifth column "condition" are prescribed for each combination row. As the values in the third column "output", there are three types of values of "absorption" (value 1), "scattering" (value 2), and "priority" (value 3). The "absorbance" (value 1) represents selection for the first measurement result and the first data alarm of the absorption photometer 44. The "scattering" (value 2) represents selection for the second measurement result and the second data alarm of the scattering photometer 45. The "priority" (value 3) represents the selection of one of two types of measurement results and data alarms according to the determination of the priority output setting. As the value of the fourth column "retesting", there are two types of values of "presence" (value 1) and "absence" (value 2). The "presence" (value 1) represents that automatic retesting is necessary (present). The "absence" (value 2) represents that automatic retesting is unnecessary (absence). As the value of the fifth column "condition", there are three types of values of "same" (value 1), "decrease" (value 2), and "increase" (value 3). The "same" (value 1) represents the same condition (remeasurement condition, and the like) as in the previous measurement. The "decrease" (value 2) represents that the condition is changed to a condition for decreasing the amount of sample 2 with respect to the condition at the time of the previous measurement. The "increase" (value 3) represents that the condition is changed to a condition for increasing the amount of sample 2 with respect to the condition at the time of the previous measurement.

As an example, in the combination (1-1) in the first row, "B2/B3"–"B2/B3" is a set of the data alarms of "absorption"-"scattering", and "output"="priority" (value 3), "retesting"="presence" (1), and "condition"="same" (value 1). In this case, the analysis control unit 50 selects and outputs the measurement result of one of the photometers and the data alarm (B2/B3) according to the determination of the priority output setting, and the data alarm as automatic retesting information for requesting automatic retesting under the same condition as the previous time is used. Similar outputs are obtained for other combinations of each row.

FIG. 5B similarly illustrates a combination of data alarms particularly derived from (B-2) sample concentration abnormality. In FIG. 5B, as the values of the first column "absorption" and the second column "scattering", according to FIG. 4, 1. "absorbance•scattered light intensity over", 2. "prozone" (B4), 3. "quantitative range upper limit over (B5)", and 4. "quantitative range lower limit over (B6)" are included. As a combination of these four types of values, there is a combination of 4×4=16.

For example, the fourth to eighth rows are four combinations in which the data alarm of "absorption" is the prozone alarm B4, and the output selections are "output"="absorption" (value 1) and "retesting"="presence" (value 1), and "condition"="decrease" (value 2). In these cases, the analysis control unit 50 selects and outputs the first measurement result of the absorption photometer 44 and the second data alarm (B4), and the data alarm for requesting automatic retesting under the condition that the amount is decreased from the previous condition is used. The ninth to twelfth rows are for the case of four combinations in which the data alarm of "absorption" is the quantitative range upper limit over alarm B5, and the output selection is the same. The thirteenth to sixteenth rows are for the case of four combinations in which the data alarm of "absorption" is the quantitative range lower limit over alarm B6. In the combination of the thirteenth row, the fourteenth row, and the fifteenth row, the output selections are "output"="absorption" (value 1), "retesting"="presence" (value 1), "condition"="increase" (value 3). In these cases, the analysis control unit 50 selects and outputs the first measurement result of the absorption photometer 44 and the first data alarm (B6), and automatic retesting information for requesting automatic retesting under the condition that the amount is increased from the previous condition is used. In the combination of the sixteenth row, the output selections are "output"="scattering" (value 2), "retesting"="present" (value 1), and "condition"="increase" (value 3). In this case, the analysis control unit 50 selects and outputs the second measurement result of the scattering photometer and the second data alarm (B6), and automatic retesting information for requesting automatic retesting under the condition that the amount is increased from the previous condition is used.

FIG. 6 illustrates, as a second part of the correspondence table, a part of a combination of (B-1) reaction process abnormality and (B-2) sample concentration abnormality with a middle level data alarm. Here, values of the first column "absorbance" and the second column "scattering" are seven types of values of "B2/B3", "B1", "calculation impossible", "absorbance/scattered light intensity difference over", "B4", "B5", and "B6" described above.

For example, the first to fourth rows are for the case of four combinations in which the data alarm of "absorption" is "B2/B3" of (B-1) reaction process abnormality, and the data alarm of "scattering" is (B-2) sample concentration abnormality. In the first to third rows, the output selections are "output" "absorption" (value 1), "retesting"="presence" (value 1), "condition"="same" (value 1). In the fourth row, the output selections are "output"="scattering" (value 2), "retesting"="presence" (1), and "condition"="increase" (value 3). The fifth to eighth rows are for the case of four combinations in which the data alarm of "absorption" is "B1" of (B-1) reaction process abnormality and the data alarm of "scattering" is (B-2) sample concentration abnormality. The output selections are the same as those in the first to fourth rows.

For example, the sixteenth to eighteenth rows are for the case of three combinations in which the data alarm of "absorption" is the prozone alarm B4 of (B-2) sample concentration abnormality, and the data alarm of "scattering" is (B-1) reaction process abnormality. In the sixteenth to eighteenth rows, output selections are "output"= "absorption" (value 1), "retesting"="presence" (value 1), and "condition"="decrease" (value 2). For example, the nineteenth to twenty-first rows are for the case of three combinations in which the data alarm of "absorption" is the quantitative range upper limit over alarm B5 of (B-2) sample concentration abnormality, and the data alarm of "scattering" is (B-1) reaction process abnormality. In the nineteenth to twenty-first rows, output selections are "output"= "absorption" (value 1), "retesting"="presence" (value 1), and "condition"="decrease" (value 2). For example, the twenty-second to twenty-fourth rows are for the case of three combinations in which the data alarm of "absorption" is the quantitative range lower limit over alarm B6 of (B-2) sample concentration abnormality and the data alarm of "scattering" is (B-1) reaction process abnormality. In the twenty-second to twenty-fourth rows, output selections are "output"="absorption" (value 1), "retesting"="presence" (value 1), and "condition"="increase" (value 3).

FIG. 7 illustrates, as a third part of the correspondence table, a part of a combination of a data alarm of middle level of (B-1) reaction process abnormality and a data alarm of low level. Here, the values of the first column "absorbance" and the second column "scattering" are six types of values of the "B2/B3", "B1", "calculation impossible", "serum information (C1)", "sample carryover", "reagent expiration date (C2) described above".

For example, the first to fourth rows are for the case of three combinations in which the data alarm of "absorption" is "B2/B3" of (B-1) reaction process abnormality and the data alarm of "scattering" has three types of low level. In the first to third rows, the output selections are "output"= "scattering" (value 2), "retesting"="absence" (value 2), "condition"="-" (no value). In these cases, the analysis control unit 50 selects and outputs the second measurement result of the scattering photometer 45 and the second data alarm (low level), and does not request automatic retesting. Similarly, the fourth to sixth rows are for the case of three combinations in which the data alarm of "absorption" is "B4" and the data alarm of "scattering" has three types of low level. Also, in these cases, the same output selection is made.

The tenth to twelfth rows are for the case of three combinations in which the data alarm of "absorption" is a serum information alarm (C1) of low level and the data alarm of "scattering" has three types of (B-1) reaction process abnormality. In the tenth to twelfth rows, the output selections are "output"="absorption" (value 1), "retesting"= "absence" (value 2), "condition"="-" (no value). In these cases, the analysis control unit 50 selects and outputs the first measurement result of the absorption photometer 44 and the first data alarm (low level), and does not request automatic retesting. Similarly, the sixteenth to eighteenth rows are for the case of three combinations in which the data alarm of "absorption" is the reagent expiration alarm (C2) and the data alarm of "scattering" has three types of (B-1) reaction process abnormality. Also, in these cases, the same output selection is made.

FIG. 8 illustrates, as a fourth part of the correspondence table, a part of a combination of a data alarm of middle level of (B-2) sample concentration abnormality and a data alarm of low level. Here, the values of the first column "absorbance" and the second column "scattering" are seven types of values of the "absorbance•scattered light intensity over", "B4", "B5", "B6", "serum information (C1)", "sample carryover", and "reagent expiration date (C2) described above".

For example, the first to fourth rows are for the case of three combinations in which the data alarm of "absorption" is "absorbance•scattered light intensity over" of (B-2) sample concentration abnormality and the data alarm of "scattering" has three types of low level. In the first to third rows, the output selections are "output"="absorption" (value 1), "retesting"="presence" (value 1), "condition"= "decrease" (value 2). Similarly, the fourth to sixth rows are for the case of three combinations in which the data alarm of "absorption" is "B4" and the data alarm of "scattering" has three types of low level. In these cases, the same output selection is made. Similarly, the seventh to ninth rows are for the case of three combinations in which the data alarm of "absorption" is "B5" and the data alarm of "scattering" has three types of low level. In these cases, the same output selection is made. Similarly, the tenth to twelfth rows are for the case of three combinations in which the data alarm of "absorption" is "B6" and the data alarm of "scattering" has three types of low level. In these cases, the output selections are "output"="scattering" (value 2), "retesting"="absence" (value 2), and "condition"="-"

The thirteenth to sixteenth rows are for the case of four combinations in which the data alarm of "absorption" is the serum information alarm C1 of low level and the data alarm of "scattering" has four types of (B-2) sample concentration abnormality. In the thirteenth to fifteenth rows, the output selections are "output"="absorption" (value 1), "retesting"= "absence" (value 2), "condition"="-". In the sixteenth row, the output selections are "output"="scattering" (value 2), "retesting"="present" (value 1), and "condition"="increase" (value 3). Similarly, in the combination from the seventeenth to twelfth rows, the same output selection is made. Similarly, a combination from the twenty-first row to the twenty-fourth row corresponds to the case where the data alarm of "absorption" is the reagent expiration alarm C2 of low level, and the same output selection is made in the combination.

[Processing Flow]

Next, a flow of output control processing by the analysis control unit 50 of the automated analyzer 1 will be described with reference to FIGS. 9 to 14.

[(1) Output Control Processing]

FIG. 9 illustrates a flow of first processing of the analysis control unit 50. The first processing indicates output control processing of selecting a measurement result and a data alarm to be output using one or both of two types of photometers. This flow has steps S201 to S210. Hereinafter, the steps will be described in order. A plurality of processing flows after FIG. 9 are illustrated and described separately as a plurality of flowcharts for explanation. These processing flows are logically connected between the steps, and can be regarded as one processing flow as a whole. That is, the processing flows can be realized as a single program processing by the CPU or the like of the analysis control unit 50 as a whole.

(S201) The simultaneous analysis determination unit 56 checks whether or not a form of an analysis request for the target sample 2 is a simultaneous analysis request. When the request is a simultaneous analysis request (Y), the processing proceeds to S204. When the request is not the simultaneous analysis request (N), the processing proceeds to S202. The case where the request is not a simultaneous analysis request corresponds to the case where a single analysis request (an absorption analysis request or a scattered light analysis request) is set by either the absorption photometer 44 or the scattering photometer 45. There may be other forms of analysis requests. For example, there may be a request for "simultaneous analysis of absorption 2 item". The "simultaneous analysis of absorption 2 item" is to simultaneously measure and analyze two types of target component substances for the reaction liquid 3 in the reaction container 25 of the sample 2 of the same target using only the absorption photometer 44.

(S202) In the case of a single analysis request, the simultaneous analysis determination unit 56 causes the output unit 71 to output all data (including the measurement result and the data alarm) measured by one of the requested photometers. With this configuration, as a result of the single analysis, a concentration which is a measurement result and a data alarm added when there is an abnormality or the like at the time of measurement are displayed on a display screen of the output unit 71.

(S203) Furthermore, the automatic retesting determination unit 57 determines whether or not automatic retesting is necessary, or the like, based on the measurement result of the single analysis based on the abnormality or the like at the time of measurement. When no data alarm is added to the measurement result or when a high level or low level data alarm is added to the measurement result, the automatic retesting determination unit 57 determines that the automatic retesting is unnecessary. When the automatic retesting is not necessary (No), this flow ends without requesting the automatic retesting. When a data alarm of middle level is added to the measurement results, the automatic retesting determination unit 57 determines that the automatic retesting is necessary, and in that case (Yes), the processing proceeds to S210.

(S210) The automatic retesting determination unit 57 performs automatic retesting request under the automatic retesting condition according to the type of the data alarm. That is, the automatic retesting determination unit 57 stores automatic retesting request information including the remeasurement condition and the like in the data storage unit 55. The automatic retesting function of the analysis control unit 50 controls automatic retesting according to the automatic retesting request information.

On the other hand, when the simultaneous analysis request is made in S201, the simultaneous analysis determination unit 56 outputs all data including both the first measurement result using the absorption photometer 44 and the second measurement result using the scattering photometer 45 for the sample 2 for which the request was made via the abnormality-during-measurement check unit 58 as described below. All data are stored in the data storage unit 55 by the measurement unit 53 and the interpretation unit 52 described above.

(S204) The abnormality-during-measurement check unit 58 determines whether or not a data alarm is added to the first measurement result and the second measurement result, which are the measurement results of the two types of photometers. That is, the abnormality-during-measurement check unit 58 checks whether or not each measurement result has an abnormality or the like at the time of measurement represented by a data alarm. As a result of this determination, (A) when there is an abnormality or the like only in the first measurement result, the processing proceeds to S207, and (B) when there is an abnormality or the like only in the second measurement result, the processing proceeds to S209. (C) When there is an abnormality or the like in both the first measurement result and the second measurement result as a result of the determination, the processing proceeds to S205 (FIG. 3). (D) When there is no abnormality or the like in both the first measurement result and the second measurement result, the processing proceeds to S206.

(S207) The abnormality-during-measurement check unit 58 causes the output unit 71 to output all data related to the scattered light analysis, including the second measurement result. With this configuration, on the display screen of the output unit 71, as a result of the simultaneous analysis, data including the concentration obtained through the scattering photometer 45 and having no abnormality or the like are output to the user with priority.

(S209) The abnormality-during-measurement check unit 58 causes the output unit 71 to output all data related to the absorbance analysis, including the first measurement result. With this configuration, on the display screen of the output unit 71, data including no abnormality and the like, including the concentration obtained through the absorption photometer 44, are output to the user with priority.

(S205) The priority output alarm determination unit 60 performs priority output alarm determination processing described later (FIG. 10). As an overview, this processing is processing for determining which of the first data alarm added to the first measurement result or the second data alarm added to the second measurement result is to be selected and output with priority.

(S206) The priority output determination unit 590 performs the priority output determination processing on the first measurement result and the second measurement result, which are the measurement results of the two types of photometers. This processing is processing for determining which type of measurement result among the two types of photometer measurement results is to be selected and output with priority. At the time of this determination, the priority output determination unit 59 refers to priority output setting information set in advance for the analysis request from the data storage unit 55. For example, priority output setting information is set as one of the parameters of analysis request information. The priority output setting information includes, for example, a priority output ranking setting value indicating which of the first measurement result and the second measurement result is to be output with priority. For example, as the priority output order, a value 1 represents a setting ("setting priority to absorption") for outputting the first measurement result with priority, and a value 2 represents a setting ("setting priority to scattering") for outputting the second measurement result with priority. Each of the priority settings basically outputs only the measurement result of one type of photometer. The priority output determination unit 59 selects one of the first measurement result and the second measurement result according to the priority output setting information of the analysis request information.

In S206, when the priority output setting function is the ON state, the processing proceeds to S207 in the case of (A) "setting priority to scattering", and proceeds to S209 in the case of (B) "setting priority to absorption". When the priority output setting function is in the OFF state, that is, (C) when there is no priority output setting between the two types of photometers, the processing proceeds to S208.

(S207) The priority output determination unit 59 causes the output unit 71 to output all data including the second measurement result of the scattering photometer 45. With this configuration, on the display screen of the output unit 71, all data including the second measurement result and having no abnormality is output to the user with priority.

(S209) The priority output determination unit 59 causes the output unit 71 to output all data including the first measurement result of the absorption photometer 44. With this configuration, on the display screen of the output unit 71, all data including first measurement result and having no abnormality is output to the user with priority.

(S208) The priority output determination unit 59 causes the output unit 71 to output all data including both the first measurement result and the second measurement result. With this configuration, on the display screen of the output unit 71, all data having no abnormality and including measurement results of the two types of photometers is output to the user. After S207, S208, or S209, this flow ends.

[(2) Priority Output Alarm Determination Processing]

Next, the contents of the priority output alarm determination processing of step S205 in FIG. 9 will be described with reference to FIG. 10 and subsequent figures. FIG. 10 illustrates a flow relating to data alarm level classification determination processing, as the first processing, of the priority output alarm determination processing of S205 by the priority output alarm determination unit 60. In this processing, a classification is determined as to which of the data alarms accompanying the respective measurement results of the two types of photometers corresponds to, based on the group and level classification definitions described above. This flow has steps S301 to S305. Hereinafter, the steps will be described in order.

(S301) The priority output alarm determination unit 60 refers to two types of data alarms of the first data alarm added to the first measurement result of the absorption photometer 44 and the second data alarm added to the second measurement result of the scattering photometer 45. The priority output alarm determination unit 60 determines whether or not one or both of the two types of data alarms include a third group and high level data alarm. When the third group and high level data alarm are included (Y), the processing proceeds to S302, and when the third group and high level data alarm are not included (N), the processing proceeds to S303.

(S302) The priority output alarm determination unit 60 executes high level data alarm processing described later (FIG. 11), and thereafter ends this flow.

(S303) The priority output alarm determination unit 60 determines whether or not one or both of the two types of data alarms include a second group and middle level data alarm. When the second group and middle level data alarm are included (Y), the processing proceeds to S304, and when the second group and middle level data alarm are not included (N), the processing proceeds to S305.

(S304) The priority output alarm determination unit 60 executes middle level data alarm processing described later (FIGS. 12 and 13), and thereafter ends this flow.

(S305) In the S303, the case where the second group and the data alarm of middle level are not included (N) corresponds to the case where the third group and the low level data alarm are included. In S305, the priority output alarm determination unit 60 executes low level alarm processing described later (FIG. 14).

[(3) High Level Data Alarm Processing]

FIG. 11 illustrates the flow of high level data alarm processing of S302. FIG. 11 has steps S401 to S405. Hereinafter, the steps will be described in order.

(S401) The priority output alarm determination unit 60 determines whether or not the high level data alarm is added to both the first measurement result and the second measurement result, in other words, determines whether or not both the first data alarm and the second data alarm are high level data alarms. When both the first and second data alarms are high level data alarms (Y), the priority output alarm determination unit 60 proceeds to S402 and otherwise (N), proceed to S403.

(S402) The priority output alarm determination unit 60 causes the output unit 71 to output both high level data alarms of the first data alarm and the second data alarm as output, and ends this flow.

(S403) The priority output alarm determination unit 60 checks whether or not one of the first data alarm and the second data alarm, for example, the first data alarm for absorption is a high level data alarm. When the first data alarm is the high level data alarm (Y), the priority output alarm determination unit 60 proceeds to S404 and otherwise (N), proceeds to S405.

(S404) The priority output alarm determination unit 60 causes the output unit 71 to output the first measurement result and the first data alarm for the absorption, and ends this flow.

(S405) The case of proceeding to S405 corresponds to a case where the second data alarm added to the second measurement result for the scattering is the high level data alarm. For that reason, in S405, the priority output alarm determination unit 60 causes the output unit 71 to output the second measurement result and the second data alarm, and ends this flow.

Regarding the processing described above, when a high level data alarm occurs, measurement has often failed and no measurement result has been obtained. For that reason, in this case, as output control, only the data alarm may be output without outputting the concentration or the like of the measurement result. When a measurement result has been obtained, the measurement result and a data alarm may be output.

As described above, the high level data alarm is added when the user needs to improve the state of the mechanism, the sample 2, the reagent 4, and the like with respect to an abnormality or the like. For that reason, as described above, when a high level data alarm is added to both the measurement results, it is desirable to output all data alarms as in S402 to alert the user and encourage the user to perform improvement work. In this case, the system alarm described above may be output simultaneously with the data alarm.

[ (4) Middle Level Alarm Processing]

FIGS. 12 and 13 illustrate middle level data alarm processing of S304. This processing can be roughly classified into (a) a case where both the first data alarm and the second data alarm are the middle level data alarms, and (b) a case where only the first data alarm is the middle level data alarm, and (c) the case where only the second data alarm is the middle level data alarm. FIG. 12 illustrates a part from step S501 to step S508. FIG. 13 illustrates a continuation of FIG. 12 from step S509 to step S520.

(S501) The priority output alarm determination unit 60 determines a more detailed type of the first data alarm added to the first measurement result of the absorption photometer 44 and the second data alarm added to the second measurement result of the scattering photometer 45 based on the classification definition described above. In S501, the priority output alarm determination unit 60 determines whether or not the first data alarm for the absorption is a data alarm derived from the high concentration of the sample 2. The data alarms of this type correspond to the prozone alarm B1, the quantitative range upper limit over alarm B2, and the like described above. When the first data alarm is a data alarm of this type (Y), the processing proceeds to S502 and otherwise (N), the processing proceeds to S504.

(S502, S503) In S502, the priority output alarm determination unit 60 causes the output unit 71 to output the first measurement result and the first data alarm. Then, in S503, the priority output alarm determination unit 60 determines that automatic retesting using the absorption photometer 44 is necessary, and stores automatic retesting request information, which has a condition for decreasing the sample amount of the target sample 2 in the reaction container 25, in the data storage unit 55. The analysis control unit 50 performs automatic retesting under the condition according to the automatic retesting request information, stores the result, and causes the output unit 71 to output the result. After S503, this flow ends.

In the cases of S501 to S503, the following judgment and output control are performed. In the first measurement result using the absorption photometer 44 suitable for the measurement of the high concentration component, when it is determined that the concentration of the target component substance of the sample 2 is too high, the reliability of the second measurement result with the scattering photometer 45 suitable for the measurement of the low concentration component is also low. For that reason, only the first measurement result for the absorption and the first data alarm are output as in S502, and the automatic retesting is performed under the condition in which the sample amount is decreased as in S503. With this configuration, an attempt is made so that the measurement result at the time of the retesting falls within a suitable quantitative range (normal output range described above) of the absorption photometer 44.

(S504) The priority output alarm determination unit 60 determines whether or not the second data alarm for scattering is a data alarm derived from the low concentration of the sample 2. This type of data alarm corresponds to the quantitive range lower limit over alarm B3 described above. When the second data alarm is the data alarm of this type (Y), the processing proceeds to S505 and otherwise (N), the processing proceeds to S507.

(S505, S506) In S505, the priority output alarm determination unit 60 causes the output unit 71 to output the second measurement result and the second data alarm for scattering. Then, in S506, the priority output alarm determination unit 60 determines that automatic retesting using the scattering photometer 45 is necessary, and stores automatic retesting request information, which has a condition for increasing the sample amount of the target sample 2 in the reaction container 25, in the storage unit 55. The analysis control unit 50 performs automatic retesting under the condition according to the automatic retesting request information, stores the result, and causes the output unit 71 to output the result. After S506, this flow ends.

In the case of S504 to S506 described above, the following determination and output control are performed. In the second measurement result using the scattering photometer 45 suitable for the measurement of the low concentration component, when it is determined that the concentration of the target component substance of the sample 2 is too low, the reliability of the first measurement result with the absorption photometer 44 suitable for the measurement of the high concentration component is also low. For that reason, only the second measurement result for the scattering and the second data alarm are output as in S505, and the automatic retesting is performed under the condition in which the sample amount is increased as in S506. With this configuration, an attempt is made so that the measurement result at the time of the retesting falls within a suitable quantitative range of the scattering photometer 45 or the absorption photometer 44.

(S507) The priority output alarm determination unit 60 determines whether or not the second data alarm of the second measurement result for the scattering is a low level data alarm. The serum information alarm C1 and the like described above correspond to this type of data alarm. When the second data alarm is the low level data alarm (Y), the processing proceeds to S508 and otherwise (N), the processing proceeds to S509 (FIG. 13).

(S508) The priority output alarm determination unit 60 causes the output unit 71 to output the second measurement result and the second data alarm for scattering. In this case, the second measurement result is output as a reference value, and the automatic retesting is not performed as unnecessary, and this flow ends.

In the case of S508, the combination of the two types of data alarms corresponds to a state in which a data alarm derived from a reaction process abnormality or a data alarm derived from a low concentration of the sample 2 is added to the first measurement result and a low level data alarm is added to the second measurement result. In this combination, at least one of the sample 2 and the reagent 4 used for the measurement has a cause for the occurrence of a low level data alarm. In this combination, the concentration of the target component substance of the sample 2 was lower than the lower limit of the quantitative range of the absorption photometer 44. For that reason, quantification was possible with the scattering photometer 45, but quantification was not possible with the absorption photometer 44 due to the low concentration. As a result, it is considered that such a combination has occurred. That is, in the case of this combination, it can be judged that the measurement itself using the scattering photometer 45 has been performed normally. For that reason, in this case, the second measurement result for the scattering is output as a reference value so that the automatic retesting is not performed.

(S509) In S509 of FIG. 13, the priority output alarm determination unit 60 determines whether or not the second data alarm of the second measurement result using the scattering photometer 45 is an alarm derived from the high concentration of the sample 2. When the data alarm is of that type (Y), the processing proceeds to S510 and otherwise (N), the processing proceeds to S513.

(S510) The priority output alarm determination unit 60 causes the output unit 71 to output the first measurement result using the absorption photometer 44 and the first data alarm.

(S511) Furthermore, the priority output alarm determination unit 60 determines whether or not the first data alarm is a data alarm derived from the reaction process abnormality. When the data alarm is of that type (Y), the processing proceeds to S516 and otherwise (N), the processing proceeds to S512.

(S516) The priority output alarm determination unit 60 determines that automatic retesting is necessary and stores automatic retesting request information, which has the same condition as the previous condition in which the abnormality or the like (that is, reaction process abnormality and the like) represented by the first data alarm occurred, in the storage unit 55. In the case of S516, the combination of data alarms corresponds to a state in which a data alarm derived from the reaction process abnormality is added to the first measurement result and a data alarm derived from a high concentration of the sample 2 is added to the second measurement result. In this case, it can be judged that the concentration of the target component substance in the sample 2 exceeds the upper limit of the quantitative range of the scattering photometer 45 and the measurement has failed in the absorption photometer 44. For that reason, in this case, remeasurement is performed under the same condition as the previous condition. As a result of the automatic retesting, the automated analyzer 1 checks whether or not the concentration of the target component substance of the sample 2 falls within the quantitative range of the absorption photometer 44. At this time, considering the case where the automatic retesting is performed under the condition for decreasing the sample amount, the concentration of the target component substance may be below the quantitative range of the scattering photometer 45. For that reason, the automatic retesting is performed under the same condition as the previous time. After S516, this flow ends.

(S512) When proceeding to S512, the priority output alarm determination unit 60 further determines whether or not the first data alarm for the absorption is a data alarm derived from the low concentration of the sample 2. When the data alarm is of that type (Y), the processing proceeds to S506 and otherwise (N), this flow ends without performing automatic retesting as unnecessary.

When the processing proceeds from S512 to S506, automatic retesting is performed under the condition for increasing the sample amount, as described above. In this case, a combination of the data alarms corresponds to a state in which the concentration of the target component substance in the second measurement result exceeds the upper limit value of the quantitative range of the scattering photometer 45, and the concentration of the target component substance in the first measurement result falls below the lower limit value of the quantitative range of the absorption photometer 44. In this case, there is a high possibility that the measurement has failed in both of the two types of photometers. For that reason, as described above an attempt is made to obtain a normal result by performing remeasurement under the same condition.

When the determination result described above S512 is NO (N) and the processing is ended without automatic retesting, the combination of data alarms corresponds to a state in which a data alarm derived from the high concentration of the sample 2 is added to the second measurement result and a low level data alarm is added to the first measurement result. This combination corresponds to the fact that at least one of the sample 2 or the reagent 4 used for the measurement has a cause for occurrence of a low level data alarm. This combination corresponds to the fact that the concentration of the target component substance in the sample 2 exceeded the upper limit of the quantitative range of the scattering photometer 45 and thus, the quantification could not be performed with the scattering photometer 45, but the quantification was possible with the absorption photometer 44. For that reason, it is considered that this combination has occurred. That is, in the case of this combination, it can be judged that the measurement has been performed normally in the first measurement result. For that reason, in this case, the first measurement result for the absorption is output as a reference value, and the automatic retesting is not performed.

(S513) The priority output alarm determination unit 60 determines whether or not the first data alarm for absorption is a data alarm derived from the reaction process abnormality. When the data alarm is of that type (Y), the processing proceeds to S514 and otherwise (N), the processing proceeds to S518.

(S514) The priority output alarm determination unit 60 selects one of the measurement results and data alarms to be output with priority from the two types of measurement results and the data alarms, and outputs the selected measurement result and data alarm, according to the "priority output setting" set as a parameter in advance. At this time, the priority output alarm determination unit 60 makes the determination with reference to the setting value of the priority output setting information described above. When the setting value is a value representing "setting priority to absorption" (A), the processing proceeds to S515, and when the setting value is a value representing "setting priority to scattering" (B), the processing proceeds to S517. As described above, in the "setting priority to absorption", the absorption photometer 44 is set as a photometer having a higher priority output order than the scattering photometer 45. In the "setting priority to scattering", a reverse priority output order is set.

(S515) The priority output alarm determination unit 60 selects the first measurement result and the first data alarm of the absorption photometer 44 according to the "setting priority to absorption" and causes the output unit 71 to output the selected first measurement result and first data alarm. After S515, the processing proceeds to S516.

(S517) The priority output alarm determination unit 60 selects the second measurement result and the second data alarm of the scattering photometer 45 according to the "setting priority to scattering" and causes the output unit 71 to output the selected second measurement result and second data alarm. After S517, the processing proceeds to S516.

(S516) After S515 or S517, in S516, the priority output alarm determination unit 60 determines that automatic retesting is necessary and performs automatic retesting request under the same condition as the previous condition. That is, the priority output alarm determination unit 60 stores the automatic retesting request information, which has the same remeasurement condition as the condition when the abnormality or the like represented by the data alarm occurs, in the data storage unit 55.

The combination of the data alarms in the cases of S513 to S517 corresponds to a state in which a data alarm derived from the reaction process abnormality is added to both the first measurement result and the second measurement result. In this case, it can be judged that the measurement has failed with both of the two types of photometers. For that reason, in this case, basically, the measurement result and the data alarm of any of the two types of photometers may be output. For that reason, in the processing example described above, one of the measurement results and the data alarms are selected based on the determination of "priority output setting" in S514, and the automatic retesting is performed under the same condition as the previous time in S516, and an attempt to acquire a normal result is made.

(S518, S519) In S518, the priority output alarm determination unit 60 causes the output unit 71 to output the first measurement result and the first data alarm for absorption. Furthermore, in S519, the priority output alarm determination unit 60 determines whether or not the first data alarm is an alarm derived from the low concentration of the sample 2. When the data alarm is of that type (Y), the processing proceeds to S520 and otherwise (N), the processing ends without performing the automatic retesting.

(S520) The priority output alarm determination unit 60 stores the automatic retesting request information under the condition for increasing the sample amount in the data storage unit 55, and causes the automatic retesting to be performed.

The combination of the data alarms in the cases of S518 to S520 corresponds to state in which a data alarm derived from a reaction process abnormality is added to the second measurement result and a data alarm derived from a low concentration of the sample 2 is added to the first measurement result. In this case, it can be judged that the measurement has failed in the scattering photometer 45. For that reason, in S519, the first measurement result and the first data alarm for absorption are output, and the automatic retesting is performed in S520. With this configuration, an attempt is made so that the measurement result at the time of automatic retesting falls within the quantitative range of the absorption spectrophotometer 44.

When the determination result in S519 is NO and the processing is ended without performing the automatic retesting (N), the combination of data alarms corresponds to a state in which a data alarm derived from a reaction process abnormality is added to the second measurement result and a low level data alarm is added to the first measurement result. In this case, it can be judged that the measurement has failed in the scattering photometer 45 and the measurement itself has been ended normally in the absorption photometer 44. For that reason, in this case, the first measurement result is output as a reference value in S519, the first data alarm is output, and the automatic retesting is not performed.

[(5) Low Level Alarm Processing]

FIG. 14 illustrates the low level data alarm processing of S305. FIG. 14 has steps S601 to S607. Hereinafter, the steps will be described in order.

(S601) The priority output alarm determination unit 60 checks whether or not both the first data alarm added to the first measurement result of the absorption photometer 44 and the second data alarm added to the second measurement result of the scattering photometer 45 are low level data alarms. If both the first and second data alarms are low level data alarms (Y), the processing proceeds to S602 and otherwise (N), the processing proceeds to S605.

(S602) The priority output alarm determination unit 60 makes a priority output determination based on the "priority output setting", and selects and outputs one of the measurement results and the data alarms to be output with priority. The priority output alarm determination unit 60 proceeds to S603 when the output is "scattering priority output" (B), and proceeds to S604 when the output is "absorption priority output" (A).

(S603) The priority output alarm determination unit 60 selects the second measurement result and the second data alarm according to the "scattering priority output" and causes the output unit 71 to output the selected second measurement result and data alarm. Thereafter, this flow ends without performing the automatic retesting.

(S604) The priority output alarm determination unit 60 selects the first measurement result and the first data alarm according to the "absorption priority output" and causes the output unit 71 to output the selected first measurement result and data alarm. Thereafter, this flow ends without performing the automatic retesting.

(S605) The priority output alarm determination unit 60 checks whether or not only the first data alarm for absorption is a low level data alarm. When only the first data alarm is the low level data alarm (Y), the processing proceeds to S606 and otherwise (N), that is, when only the second data alarm for scattering is the low level data alarm, the processing proceeds to S607.

(S606) The priority output alarm determination unit 60 selects the first measurement result and the first data alarm for absorption, and causes the output unit 71 to output the first measurement result and data alarm. Thereafter, this flow ends without performing the automatic retesting.

(S607) The priority output alarm determination unit 60 selects the second measurement result and the second data alarm for scattering, and causes the output unit 71 to output the second measurement result and data alarm. Thereafter, this flow ends without performing the automatic retesting.

As described above, in the case of each combination including a low level data alarm, it can be judged that the measurement itself has been ended normally, and thus the measurement result is output as a reference value and automatic retesting is not performed.

[Effects or the Like]

As described above, the automated analyzer 1 of Embodiment 1 includes two types of photometers of the absorption photometer 44 and the scattering photometer 45, and performs simultaneous analysis using the two types of photometers for the target component substance of each test item. The automated analyzer 1 refers to two types of data alarms that can be added to the two types of measurement results. Then, when there are two types of data alarms due to an abnormality or the like at the time of measurement in both of the two types of measurement results, the automated analyzer 1 selects a suitable measurement result and a data alarm to be output according to the combination of the data alarms. As such, the automated analyzer 1 performs output control so as to limit or reduce the information amount of the analysis result output to the user even when there is an abnormality or the like at the time of measurement using the two types of photometers. With this configuration, according to the automated analyzer 1, more accurate analysis results can be obtained in the simultaneous analysis than in the prior art example, and even when there is an abnormality or the like at the time of measurement, the load of the user's judgment and operation on the analysis result output can be reduced. As a user, when viewing the analysis result output on the display screen, information such as suitable measurement results and data alarms is automatically selected and limited, so that the state can be easily recognized and judged, and coping work can be easily performed. For that reason, it is possible to prevent the user from making a judgment error and prevent a result report delay.

The automated analyzer 1 automatically performs suitable automatic retesting control according to a combination of data alarms even when an abnormality or the like occurs at the time of measurement using two types of photometers. The automated analyzer 1 determines whether or not automatic retesting is necessary and condition of the automatic retesting so as to reflect at least one of a device state and a sample component state even when there is an abnormality or the like in both types of measurements. The automated analyzer 1 determines whether or not automatic retesting is necessary and condition of suitable automatic retesting according to the combination, controls the automatic retesting, and outputs the result. Therefore, the automatic retesting function of the automated analyzer 1 can be effectively used, and a more accurate result (concentration and the like) can be obtained in a shorter time by the automatic retesting, and the result report delay by the user can be prevented.

Modification Example (1)

Modification examples of the automated analyzer 1 of Embodiment 1 include the following ones. In Embodiment 1, the case where two types of two photometers are provided has been described, but the present invention is not limited thereto and can also be similarly applied to a case where three or more types of three or more photometers are provided. The present invention can also be similarly applied to a case where a plurality of predetermined types of photometers are provided. For example, when three types of photometers are provided, simultaneous analysis using three types of photometers may be performed. Alternatively, of the three types of photometers, simultaneous analysis may be performed using two types of photometers selected according to settings and analysis requests. Output selection control may be performed in a similar manner corresponding to a combination of a plurality of data alarms added to the plurality of measurement results.

Modification Example (2)

In Embodiment 1, it has been described that data alarms according to abnormalities and the like are roughly classified into three groups and levels and different output controls are performed according to the combinations thereof. The classification of the data alarms is possible without being limited to three groups and levels. As indicated in the correspondence table, any configuration may be adopted as long as the correlation between the measurement result and the output selection including the data alarm is prescribed for each combination of the data alarms related to the measurement results of the plurality of types of photometers.

Modification Example (3)

In Embodiment 1, when a combination occurs in which there is no particular problem in outputting which information of two types of measurement results and data alarms because the influence on the user is small, one of the pieces of information is selected and output based on the "priority output setting". The present invention is not limited to this, and as a modification example, in the case of the specific combination described above, a mode in which the "priority output setting" function is not used may be adopted. In this modification example, based on fixed settings in implementation, in the case of the specific combination described above, only one of the pieces of prescribed information is output, or both pieces of information are output.

Modification Example (4)

In each of the flowcharts described above, although an example of the processing order in the output control processing is illustrated, but is not limited thereto, and is possible. For example, it is of course possible to adopt a configuration of a processing flow in which the order of determination of types such as levels and abnormalities is changed. The following is also possible as a modification example of the processing flow configuration of Embodiment 1. Before the processing proceeds to step S508 based on the determination result (Y) in step S507 of the middle level data alarm processing in FIG. 12, the following step S507-1 is provided. In step S507-1, it is determined whether or not a low level data alarm is added to the first measurement result for absorption. When the low level data alarm has been added (Y), the processing proceeds to step S601 in FIG. 14, and when it has not been added (N), the processing proceeds to step S508. That is, in the case of this flow configuration, the middle level data alarm processing and the low level data alarm processing are realized as one flowchart. In this case, in the processing flow of FIG. 10, only the determination regarding the high level data alarm of S301 is performed. When it is determined, in S301, that the high level data alarm is included (Y), the high level data alarm processing of S302 is performed, and when it is not included (N), a processing flow in which the middle level and low level processing are integrated is performed.

Embodiment 2

The automated analyzer according to Embodiment 2 of the present invention will be described with reference to FIG. 15. The basic configuration in Embodiment 2 and the like is the same as that in Embodiment 1, and the components different from Embodiment 1 in Embodiment 2 and the like will be described.

[Processing Flow]

In Embodiment 1, data alarms related to a plurality (two types) of photometers are classified into the three groups and levels described above. The middle level was further classified into a data alarm derived from (B-1) reaction process abnormality and a data alarm derived from (B-2) sample concentration abnormality. Data alarms derived from the sample concentration abnormality were classified into data alarms derived from high concentrations and data alarms derived from low concentrations. Then, as illustrated in FIG. 5 and the like, the output is selected according to the combination of the data alarms.

In Embodiment 2, it is not essential to classify the data alarms (corresponding abnormalities and errors, and the like) related to a plurality (two types) of photometers into the groups and levels described above, and it is only necessary to grasp a plurality of individual data alarms that can occur. The automated analyzer according to Embodiment 2 refers to individual data alarms added to the measurement results using the individual photometers on the processing flow, and directly selects an output according to the combination of the data alarms. In Embodiment 2, the correlation between the combination of data alarms and the output is prescribed in advance, as in the example of the correspondence table described above. The processing flow in Embodiment 2 is implemented based on the prescription regulation. The analysis control unit 50 refers to data such as two types of measurement results and data alarms stored in the data storage unit 55 as a processing result by the interpretation unit 52. The analysis control unit 50 determines the combination of the referred data alarms and selects the measurement result, the data alarm, and the automatic retesting information as the correlated output according to the combination, in the processing flow.

The configuration of the processing flow according to Embodiment 2 is different from the configuration of the processing flow according to Embodiment 1 in the contents (such as FIG. 10) of the priority output alarm determination processing of step S205 in FIG. 9 described above. FIG. 15 illustrates a part of a processing flow configuration example in the automated analyzer 1 of Embodiment 2. In the automated analyzer 1, at the time of the output control processing relating to the simultaneous analysis using two types of photometers, the processing is performed according to the flow illustrated in FIG. 15 instead of the flows illustrated in FIG. 10 and the like. In the flow of FIG. 15, the analysis control unit 50 first determines whether or not the aforementioned sample shortage alarm A1 is added as a first data alarm to the first measurement result of the absorption photometer 44 in step S151. When the sample shortage alarm A1 has been added (Y), the processing proceeds to S152, and when it has not been added (N), the processing proceeds to another step (omitted). In S152, the analysis control unit 50 determines whether or not the sample shortage alarm A1 is added as a second data alarm to the second measurement result using the scattering photometer 45. When the sample shortage alarm A1 has been added (Y), the processing proceeds to S153, and when it has not been added (N), the processing proceeds to S154. The case (Y) where the sample shortage alarm A1 is added in S152 corresponds to the case where both are the sample shortage alarms A1 as a combination of two types of data alarms. In S151 and S152, checking on such a combination is being performed. Assuming that the combination is the first combination, for example, the analysis control unit 50 causes the first data alarm and the second data alarm, which are both two types of data alarms, to be output, as outputs according to the first combination, in S153. The processing contents at this time are the same as the processing contents of S401 and S402 of the high level data alarm processing of FIG. 11 of Embodiment 1.

For example, in S154, the analysis control unit 50 determines whether or not the reagent shortage alarm A2 described above is added as the second data alarm of the second measurement result. When the reagent shortage alarm A2 has been added (Y), the processing proceeds to S155, and when it has not been added (N), the processing proceeds to another step (omitted). That is, in S151 and S154, the combination in which the first data alarm is the sample shortage alarm A1 and the second data alarm is the reagent shortage alarm A2 is checked. Assuming that the combination is the second combination, for example, the analysis control unit 50 causes the first data alarm and the second data alarm to be output, as outputs according to the second combination, in S155.

As in the processing flow example described above, in the automated analyzer 1 of Embodiment 2, for two types of data alarms, a corresponding combination of all possible data alarm combinations is determined and an output is selected according to the determined combination based on a predetermined criterion, as in Embodiment 1.

As described above, according to Embodiment 2, the same effects as in Embodiment 1 can be obtained.

Embodiment 3

An automated analyzer according to Embodiment 3 of the present invention will be described with reference to FIGS. 16 and 17. In the automated analyzer 1 according to Embodiment 3, according to the judgment of the analysis control unit 50, not only a data alarm according to an abnormality or the like at the time of measurement is added to each measurement result of the two types of photometers, but also automatic retesting information related to the automatic retesting function is created and added. In particular, the interpretation unit 52 adds a data alarm according to an abnormality or the like to a measurement result of a certain photometer, and judges whether automatic retesting is necessary and a remeasurement condition, and the like. Then, the interpretation unit 52 adds the automatic retesting information including information such as a necessity of automatic retesting and the remeasurement condition in association with the information of the target sample 2 or the reaction container 25, the measurement results, and the data alarms and stores it in the data storage unit 55 as interpretation data.

The processing unit, such as the simultaneous analysis determination unit 56 of the analysis control unit 50 refers to the analysis data stored in the data storage unit 55 and related to each of the two types of photometers, including the measurement result, the data alarm, and the automatic retesting information. Then, the simultaneous analysis determination unit 56 and the like select an output according to a combination of the data alarm and the automatic retesting information in these two types of data, based on the criteria prescribed by a predetermined correspondence table. The selected output (that is, analysis result output information) includes a measurement result, a data alarm, and automatic retesting information, as in Embodiment 1. As described above, the automated analyzer 1 according to Embodiment 3 differs from Embodiment 1 in processing related to the automatic retesting function. As described above, in Embodiment 3, the interpretation unit 52 once makes a judgment related to the automatic retesting function for each measurement result of an individual photometer, and creates and adds automatic retesting information. The automatic retesting information (the retesting flag information described below) added by the interpretation unit 52 has a different meaning from the automatic retesting information described above. Thereafter, the analysis control unit 50 selects and determines the output including the automatic retesting information comprehensively again according to the combination of the two types of measurement results including the automatic retesting information and the data alarm.

[Automatic Retesting Information (Retesting Flag)]

In Embodiment 3, the interpretation unit 52 creates and adds automatic retesting information (referred to as retesting flag information) in a predetermined format. For example, when adding the first data alarm according to the abnormality or the like at the time of measurement to the first measurement result using the absorption photometer 44, the interpretation unit 52 judges whether or not automatic retesting is necessary, and a remeasurement condition and the like when the automatic retesting is necessary. The interpretation unit 52 adds automatic retesting information (first retesting flag) according to the judgment result to the first measurement result and the first data alarm. Similarly, when adding a second data alarm according to an abnormality or the like at the time of measurement to the second measurement result using the scattering photometer 45, the interpretation unit 52 judges whether or not automatic retesting is necessary, and a remeasurement condition when the automatic retesting is necessary, and the like. The interpretation unit 52 adds automatic retesting information (second retesting flag) according to the judgment result to the second measurement result and the second data alarm.

The retesting flag is a value that represents the necessity (presence or absence) of automatic retesting and a remeasurement condition using a corresponding type of photometer. The interpretation unit 52 stores the data including the measurement result, the data alarm, and the retesting flag in the data storage unit 55 so as to be correlated with the analysis request information of the reaction container 25 or the corresponding sample 2 from which the target measurement value has been obtained.

In Embodiment 3, retesting flags are classified into the following four types according to the type of data alarm. F1 to F4 are used as identifiers of the retesting flag.

(1) First retesting flag F1="No retesting flag": The first retesting flag F1 represents that automatic retesting is unnecessary (absence). Instead of adding the first retesting flag F1, the retesting flag itself may not be added.

(2) Second retesting flag F2="same condition retesting flag": The second retesting flag F2 represents that automatic retesting is necessary (presence), and that the condition is the same remeasurement condition as that at the time of the previous measurement (that is, when an abnormality or the like is detected).

(3) Third retesting flag F3="decrease retesting flag": The third retesting flag F3 represents that the automatic retesting is necessary (presence) and that the condition is such that the sample amount is decreased with respect to the condition at the time of the previous measurement.

(4) Fourth retesting flag F4="increase retesting flag": The fourth retesting flag F4 represents that the automatic retesting is necessary (presence) and that the condition is such that the sample amount is increased with respect to the condition at the time of the previous measurement.

In the processing flow in Embodiment 3, for example, the level determination processing in FIG. 10 of Embodiment 1 and the high level data alarm processing in FIG. 11 are the same.

[Processing Flow]

FIGS. 16 and 17 illustrate the flow of the middle level data alarm processing by the analysis control unit 50 (particularly, the simultaneous analysis determination unit 56 and the like) in Embodiment 3. FIG. 16 illustrates steps S701 to S708. FIG. 17 is a continuation of FIG. 16 and illustrates steps S709 to S720. This processing is performed when the data alarms added to the two types of measurement results include a medium level data alarm, as in the flow to step S304 in FIG. 10. In the processing example of FIG. 16, the output is selected based on the judgment of the retesting flag described above.

(S701) The analysis control unit 50 determines whether or not the "decrease retesting flag" (third retesting flag F3) is added to the first measurement result and the first data alarm of the absorption photometer 44, as a retesting flag. When the "decrease retesting flag" has been added (Y), the processing proceeds to S702, and when it has not been added (N), the processing proceeds to S704.

(S702, S703) In S702, the analysis control unit 50 causes the output unit 71 to output the first measurement result and the first data alarm. Then, in S703, the analysis control unit 50 judges that the automatic retesting is necessary, and stores, in the data storage unit 55, the automatic retesting request information, which has a condition for decreasing the sample amount with respect to the previous condition. The analysis control unit 50 controls the automatic retesting according to the automatic retesting request information and outputs the result. After S703, this flow ends.

The "decrease retesting flag" (third retesting flag F3) is added when the concentration of the target component substance of the sample 2 is too high. In the first measurement result using the absorption photometer 44 suitable for the measurement of the high concentration component, when it is determined that the concentration of the target component substance of the sample 2 is too high (for example, exceeds the upper limit of the quantitative range), the reliability of the second measurement result using the scattering photometer 45 suitable for the measurement of the low concentration component is also low. For that reason, in this case, the first measurement result is output, and the automatic retesting is performed under the condition for decreasing the sample amount as described above. With this configuration, an attempt is made to make the measurement result at the time of the retesting falls within the quantitative range of the absorption photometer 44.

(S704) The analysis control unit 50 determines whether or not the "increase retesting flag" (fourth retesting flag F4) is added to the second measurement result and the second data alarm of the scattering photometer 45. When the "increase retesting flag" has been added (Y), the processing proceeds to S705, and when it has not been added (N), the processing proceeds to S707.

(S705, S706) In S705, the analysis control unit 50 causes the output unit 71 to output the second measurement result and the second data alarm. Then, in S706, the analysis control unit 50 stores, in the data storage unit 55, automatic retesting request information, which has a condition for increasing the sample amount with respect to the previous condition. The analysis control unit 50 controls the automatic retesting according to the automatic retesting request information. After S705, this flow ends.

The "increase retesting flag" (fourth retesting flag F4) is added when the concentration of the target component substance of the sample 2 is too low. In the second measurement result using the scattering photometer 45 suitable for the measurement of the low concentration component, when it is determined that the concentration of the target component substance of the sample 2 is too low (for example, below the lower limit of the quantitative range), the reliability of the first measurement result using the absorption photometer 44 suitable for the measurement of the high concentration component is low. For that reason, in this case, the second measurement result is output, and the automatic retesting is performed under the condition for increasing the sample amount as described above. With this configuration, an attempt is made to make the measurement result at the time of the retesting falls within the quantitative range of the scattering photometer 45 or the absorption photometer 44.

(S707) The analysis control unit 50 determines whether or not the "no retesting flag" (first retesting flag F1) is added to the second measurement result and the second data alarm. Alternatively, this step S707 may be used to check whether or not the retesting flag itself is added. When the retesting flag has been added (Y), the processing proceeds to S708, and when it has not been added (N), the processing proceeds to S709.

(S708) The analysis control unit 50 causes the output unit 71 to output the second measurement result and the second data alarm, does not perform the automatic retesting, and ends this flow after S708.

(S709) In FIG. 17, when proceeding to S709, the retesting flag accompanying the second measurement result corresponds to the case of the "decrease retesting flag" (third retesting flag F3) or the "same condition retesting flag" (second retesting flag F2). In S709, the analysis control unit 50 determines whether or not the "decrease retesting flag" (third retesting flag F3) is added to the second measurement result and the second data alarm. When the "decrease retesting flag" has been added (Y), the processing proceeds to S710, and when it has not been added (N), the processing proceeds to S713.

(S710) The analysis control unit 50 outputs the first measurement result and the first data alarm of the absorption photometer 44 via the output unit 71.

(S711) The analysis control unit 50 further determines whether or not the same condition retesting flag (second retesting flag F2) is added to the first measurement result. When the same condition retesting flag has been added (Y), the processing proceeds to S716, and when it has not been added (N), the processing proceeds to S712.

(S716) The analysis control unit 50 stores the automatic retesting request information, which has the same condition as the condition at the time of the previous measurement, in the data storage unit 55. The analysis control unit 50 controls the automatic retesting according to the automatic retesting request information. After S716, this flow ends.

(S712) When proceeding to S712, the analysis control unit 50 further determines whether or not the increase retesting flag (fourth retesting flag F4) is added to the first measurement result. When the increase retesting flag has been added (Y), the processing proceeds to S706, and when it has not been added (N), this flow ends without performing the automatic retesting.

(S713) The analysis control unit 50 determines whether or not the same condition retesting flag (second retesting flag F2) is added to the first measurement result. When the same condition retesting flag has been added (Y), the processing proceeds to S714, and when it has not been added (N), the processing proceeds to S718.

(S714) The analysis control unit 50 makes a priority output determination according to the "priority output setting". When the output is "absorption priority output" (A), the processing proceeds to S715, and when the output is "scattering priority output" (B), the processing proceeds to S717.

(S715) The analysis control unit 50 causes the output unit 71 to output the first measurement result using the absorption photometer 44 and the corresponding first data alarm according to the "absorption priority output".

(S717) The analysis control unit causes the output unit 71 to output the second measurement result using the scattering photometer 45 and the corresponding second data alarm according to the "scattering priority output".

(S716) After S715 or S717, in S716, the analysis control unit 50 stores the automatic retesting request information, which has the same condition as the condition at the time of the previous measurement, in the data storage unit 55.

(S718) The analysis control unit 50 causes the output unit 71 to output the first measurement result and the first data alarm using the absorption photometer 44.

(S719) The analysis control unit 50 further determines whether or not the increase retesting flag (fourth retesting flag F4) is added to the first measurement result. When the increase retesting flag has been added (Y), processing proceeds to S720, and when it has not been added (N), this flow ends without performing automatic retesting.

(S720) The analysis control unit 50 stores automatic retesting request information, which has a condition for increasing the sample amount with respect to the previous condition, in the data storage unit 55. After S720, this flow ends.

As in the processing example described above, in Embodiment 3, the outputs (measurement result, data alarm, and auto retesting information) are comprehensively selected according to the combination of the measurement result, data alarm, and retesting flag for each type of photometer. With this configuration, even when both of the two types of measurement have an abnormality or the like, the automatic retesting can be appropriately controlled and the remeasurement can be performed promptly. Accordingly, more accurate results can be obtained, and a delay in the user's result report and the like can be prevented.

When the condition for reducing or increasing the sample amount is determined as the remeasurement condition and the like, which is the condition of the automatic retesting, for example, the following method may be used. As the method, the sample amount and the like of the remeasurement condition is determined, by using a value such as a predetermined amount or ratio determined in advance, by reflecting the value of the predetermined amount or ratio to the value of the previous condition by addition or multiplication. Alternatively, as another method, the sample amount under the remeasurement condition may be determined by defining and setting some candidate sample amount condition in advance, and selecting and switching from these conditions.

As described above, the present invention has been specifically described based on the embodiments, but is not limited to the embodiments described above, and can be variously modified without departing from the gist thereof.

REFERENCE SIGNS LIST

1: automated analyzer
2: sample
3: reaction liquid
4: reagent
25: reaction container
44: absorption photometer
45: scattering photometer
50: analysis control unit

The invention claimed is:

1. An automated analyzer comprising:
a plurality of types of a plurality of photometers, each of the photometers being configured to measure a different quantitative range of a concentration of a target sample in a reaction container; and
an analysis control unit connected to the plurality of photometers and configured to control analysis of the target sample including measurement of the concentration of the target sample using the plurality of photometers,
wherein the analysis control unit is configured to
acquire a plurality of measurement results from the plurality of photometers,
determine, for each measurement result of the plurality of measurement results, whether at least one abnormality has occurred based on a comparison between the measurement result and a respective quantitative range of a photometer, included in the plurality of photometers, that provided the measurement result to the analysis control unit, determine a type of the at least one abnormality based on the comparison, and associate, as a data alarm among a plurality of different data alarms, the type of the at least one abnormality with the measurement result in a data table,
in a case in which a plurality of different data alarms are associated in the data table with the plurality of measurement results, select a first measurement result of the plurality of measurement results and a first data alarm of the plurality of different data alarms to be output from a combination of the plurality of different data alarms and the plurality of measurement results based on a predetermined priority output setting of the plurality of measurement results, and output the first measurement result and the first data alarm to a user as an analysis result.

2. The automated analyzer according to claim 1,
wherein the analysis control unit is further configured to determine whether automatic retesting of the target sample is necessary based on the measurement results and an abnormality determination, and in a case in which the automatic retesting is necessary select automatic retesting information including a type of photometer to be used in the automatic retesting, and a remeasurement condition in the automatic retesting corresponding to the combination of the plurality of different data alarms, and control the automatic retesting according to the automatic retesting information.

3. The automated analyzer according to claim 2,
wherein the data alarm is classified into a high level, a middle level, and a low level as a plurality of levels,
the high level is a level at which the automatic retesting is necessary and a state improvement work by the user is necessary for the automatic retesting,
the middle level is a level at which the automatic retesting is necessary, and the state improvement work by the user is unnecessary for the automatic retesting,
the low level is a level at which the automatic retesting is unnecessary, and
the analysis control unit determines the level for the combination of the plurality of different data alarms and selects the automatic retesting information to be output corresponding to the level.

4. The automated analyzer according to claim 3,
wherein, as a data alarm having the high level, at least one of a sample shortage alarm, a reagent shortage alarm, a clogging detection alarm, a detergent shortage alarm, and a photometer abnormality alarm is included.

5. The automated analyzer according to claim 3,
wherein, as a data alarm having the middle level, a data alarm derived from a reaction process abnormality and a data alarm derived from a sample concentration abnormality are included, and
as the data alarm derived from a reaction process abnormality, at least one of a cell blank abnormality alarm, an absorbance difference abnormality alarm, and a scattered light intensity difference abnormality alarm is included, and
as the data alarm derived from a sample concentration abnormality, at least one of a prozone alarm, a quantitative range upper limit over alarm, and a quantitative range lower limit over alarm is included.

6. The automated analyzer according to claim 3,
wherein, as a data alarm having the low level, at least one of a serum information alarm and a reagent expiration alarm is included.

7. The automated analyzer according to claim 2,
wherein the analysis control unit is configured to
associate retesting flag information for control of the automatic retesting with a measurement result for each type of the photometer in the data table, based on a result obtained by performing a judgment regarding the automatic retesting together with a judgment to add the data alarm, and
select the analysis result including the measurement result, the data alarm, and automatic retesting information to be output corresponding to a combination of plural pieces of retesting flag information associated with the plurality of measurement results.

8. The automated analyzer according to claim 1,
wherein
the analysis control unit is configured to associate the data alarm to the measurement result for each type of the photometer based on a predetermined priority ranking of each of the plurality of different data alarms.

9. The automated analyzer according to claim 2,
wherein, as the remeasurement condition, with respect to the condition at the time of the previous measurement, the same condition, a condition for decreasing a sample amount, and a condition for increasing the sample amount, are included.

10. The automated analyzer according to claim 1, wherein the plurality of types of the plurality of photometers include an absorption photometer and a scattering photometer.

11. An automated analysis method in an automated analyzer, the automated analyzer including a plurality of types of a plurality of photometers, each of the photometers being configured to measure a different quantitative range of a concentration of a target sample in a reaction container, and an analysis control unit connected to the plurality of photometers and configured to control analysis of the target sample including measurement of the concentration of the target sample using the plurality of photometers, the method comprising:

as steps executed by the analysis control unit, a step of acquiring a plurality of measurement results from the plurality of photometers;

a step of, determining for each measurement result of the plurality of measurement results, whether at least one abnormality has occurred based on a comparison between the measurement result and a respective quantitative range of a photometer, included in the plurality of photometers, that provided the measurement result to the analysis control unit, determining a type of the at least one abnormality based on the comparison, and associating, as a data alarm among a plurality of different data alarms, the type of the at least one abnormality with the measurement result in a data table; and a step of, in a case in which a plurality of different data alarms are associated in the data table with the plurality of measurement results, selecting a first measurement result of the plurality of measurement results and a first data alarm of the plurality of different data alarms to be output from a combination of the plurality of different data alarms and the plurality of measurement results based on a predetermined priority output setting of the plurality of measurement results, and outputting the first measurement result and the first data alarm to a user as an analysis result.

12. The automated analysis method according to claim 11, the method comprising as a step executed by the analysis control unit, a step of determining whether automatic retesting of the target sample is necessary based on the measurement results and an abnormality determination, and in a case in which the automatic retesting is necessary selecting automatic retesting information including a type of photometer to be used in the automatic retesting, and a remeasurement condition in the automatic retesting corresponding to the combination of the plurality of different data alarms, and controlling the automatic retesting according to the automatic retesting information.

* * * * *